US008942261B2

(12) United States Patent
Takada et al.

(10) Patent No.: US 8,942,261 B2
(45) Date of Patent: Jan. 27, 2015

(54) TRANSMISSION APPARATUS AND METHOD

(71) Applicant: Canon Kabushiki Kaisha, Tokyo (JP)

(72) Inventors: Tomoyuki Takada, Tokyo (JP); Noriyuki Suzuki, Tokyo (JP); Makoto Umehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/897,078

(22) Filed: May 17, 2013

(65) Prior Publication Data

US 2013/0266027 A1    Oct. 10, 2013

Related U.S. Application Data

(62) Division of application No. 12/425,448, filed on Apr. 17, 2009.

(30) Foreign Application Priority Data

May 7, 2008    (JP) .................... 2008-121645
May 7, 2008    (JP) .................... 2008-121647

(51) Int. Cl.
*H04J 3/06*     (2006.01)
*H04L 7/04*     (2006.01)
*H04L 27/26*    (2006.01)

(52) U.S. Cl.
CPC .............. *H04L 7/04* (2013.01); *H04L 27/2602* (2013.01); *H04L 27/2626* (2013.01)
USPC ....................................................... 370/503

(58) Field of Classification Search
USPC ........................................................ 370/503
See application file for complete search history.

(56) References Cited

U.S. PATENT DOCUMENTS

| 7,020,116 | B1 | 3/2006 | Nakada ..................... 370/338 |
| 8,165,238 | B2 | 4/2012 | Umehara ................... 375/260 |
| 8,184,662 | B2* | 5/2012 | Umehara et al. .......... 370/474 |
| 2004/0008804 | A1 | 1/2004 | Honken et al. ............ 375/375 |
| 2004/0070688 | A1* | 4/2004 | Bazarsky et al. .......... 348/469 |
| 2006/0170823 | A1* | 8/2006 | FanChiang et al. ........ 348/536 |
| 2007/0008219 | A1 | 1/2007 | Hoffmann et al. ......... 342/367 |
| 2008/0068234 | A1 | 3/2008 | Forman et al. ............... 341/61 |
| 2008/0219295 | A1 | 9/2008 | Umehara et al. ........... 370/512 |

(Continued)

FOREIGN PATENT DOCUMENTS

| JP | 62-072251 A | 4/1987 |
| JP | 2001-036495 A | 2/2001 |

(Continued)

*Primary Examiner* — Mark Rinehart
*Assistant Examiner* — Christopher R Crompton
(74) *Attorney, Agent, or Firm* — Fitzpatrick, Cella, Harper & Scinto

(57) ABSTRACT

A burst signal generator generates a burst signal that is a variable length portion whose length changes in accordance with fluctuations in data input at a predetermined period. An OFDM modulator generates an OFDM signal (including a guard interval portion and an effective symbol portion) that is a fixed length portion containing data corresponding to n (n is a positive integer) times or 1/n of the predetermined period. A frame includes the variable length portion and the fixed length portion. This makes a transmission signal actually have a frame period almost equal to the period of a signal synchronized with the clock of a player, including the fluctuations.

6 Claims, 25 Drawing Sheets

(56) References Cited

U.S. PATENT DOCUMENTS

| | | | |
|---|---|---|---|
| 2009/0103649 A1 | 4/2009 | Vare et al. | 375/295 |
| 2009/0220094 A1 | 9/2009 | Lin | 381/2 |
| 2009/0316812 A1 | 12/2009 | Sahara | 375/260 |
| 2011/0216786 A1 | 9/2011 | Wu et al. | 370/479 |

FOREIGN PATENT DOCUMENTS

| | | |
|---|---|---|
| JP | 2001-103033 A | 4/2001 |
| JP | 2005-151208 A | 6/2005 |
| JP | 2008-042857 A | 2/2008 |
| JP | 2008-252870 A | 10/2008 |

* cited by examiner

F I G. 9
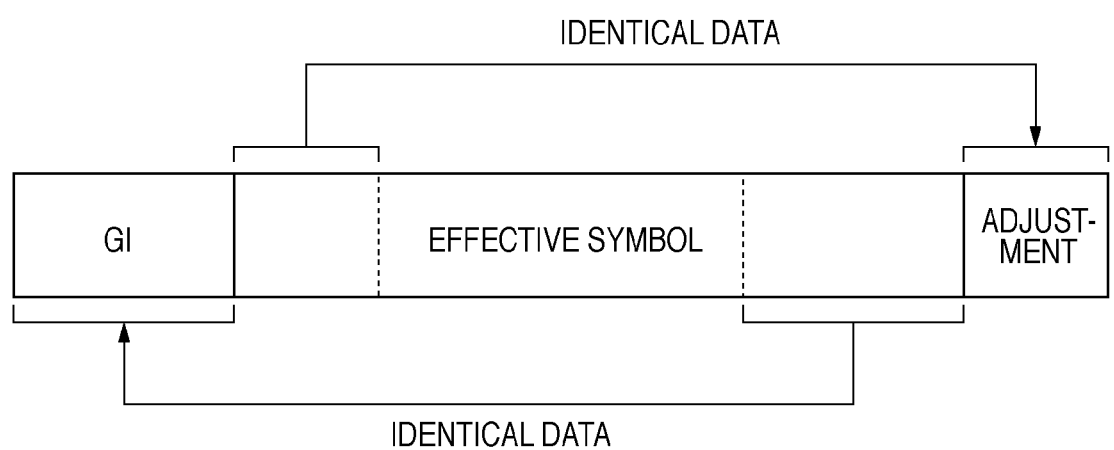

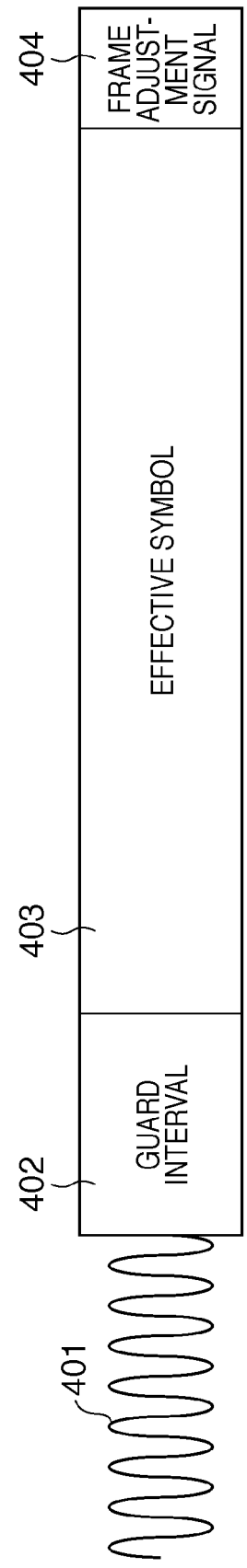

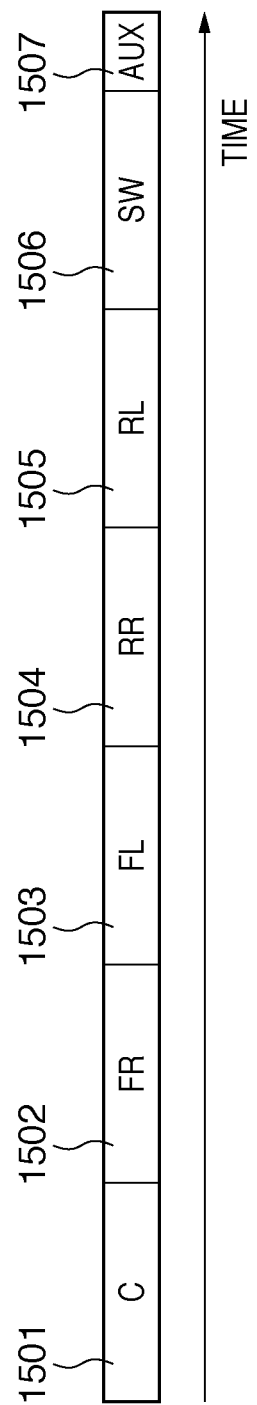

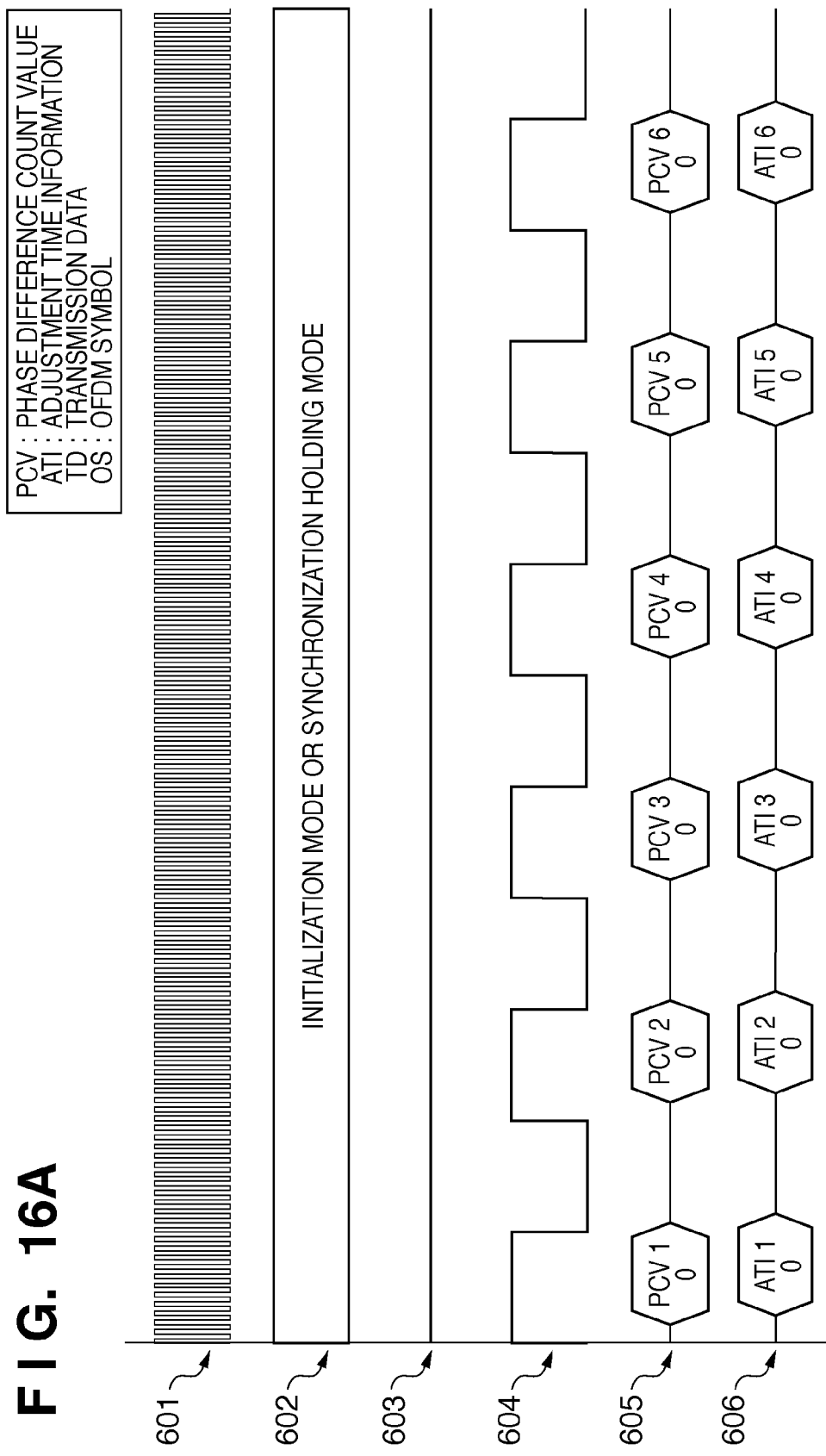

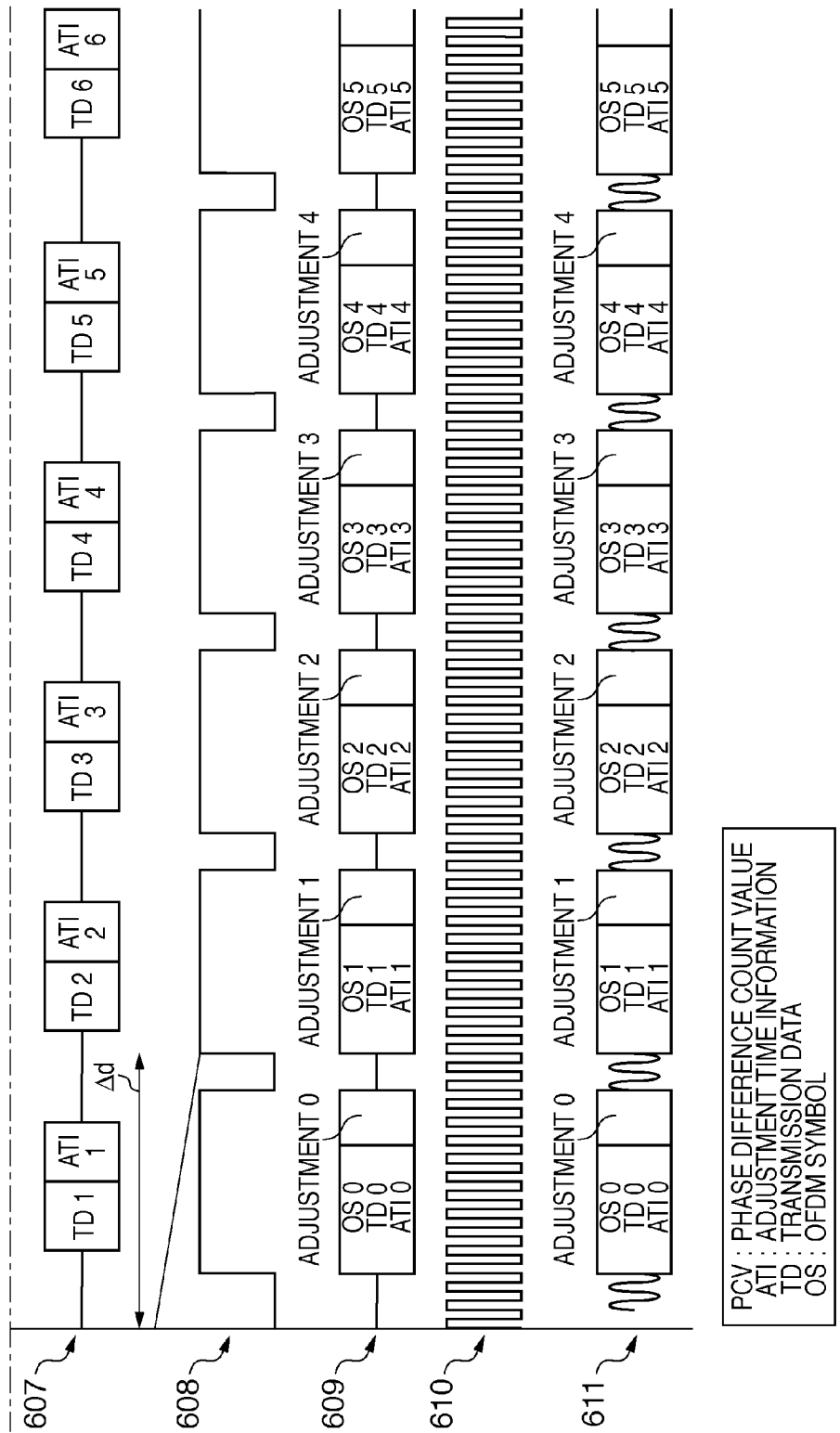

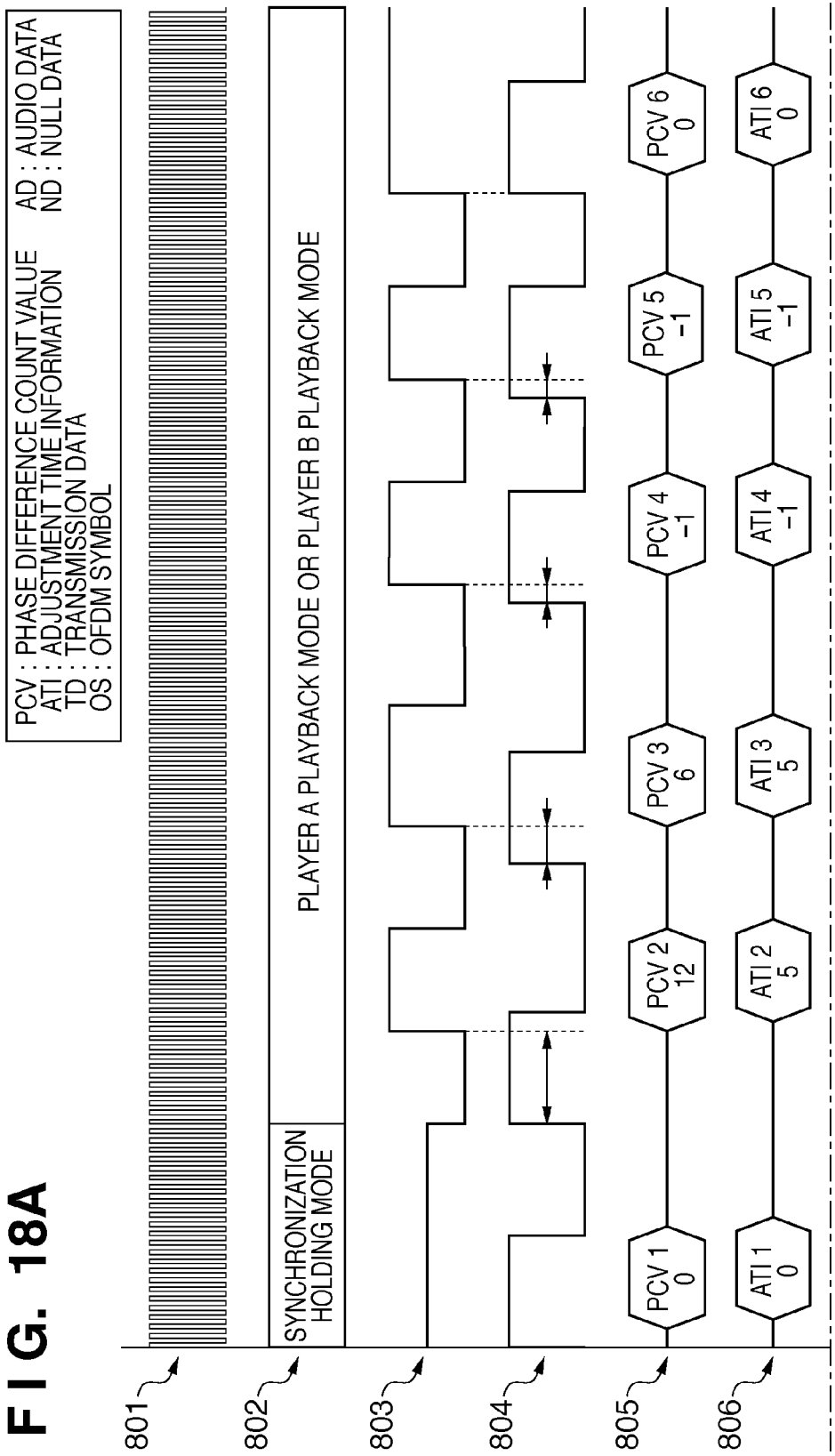

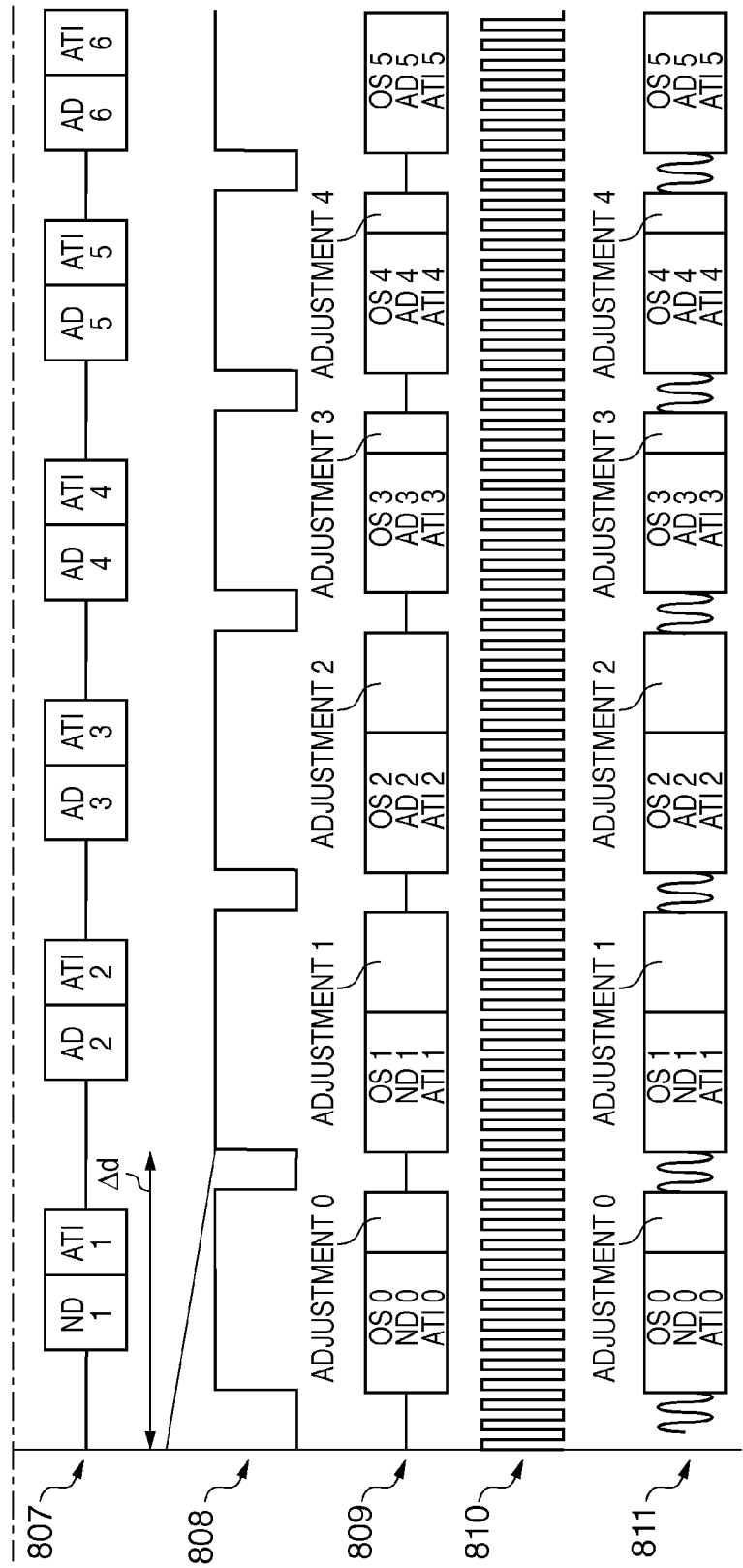

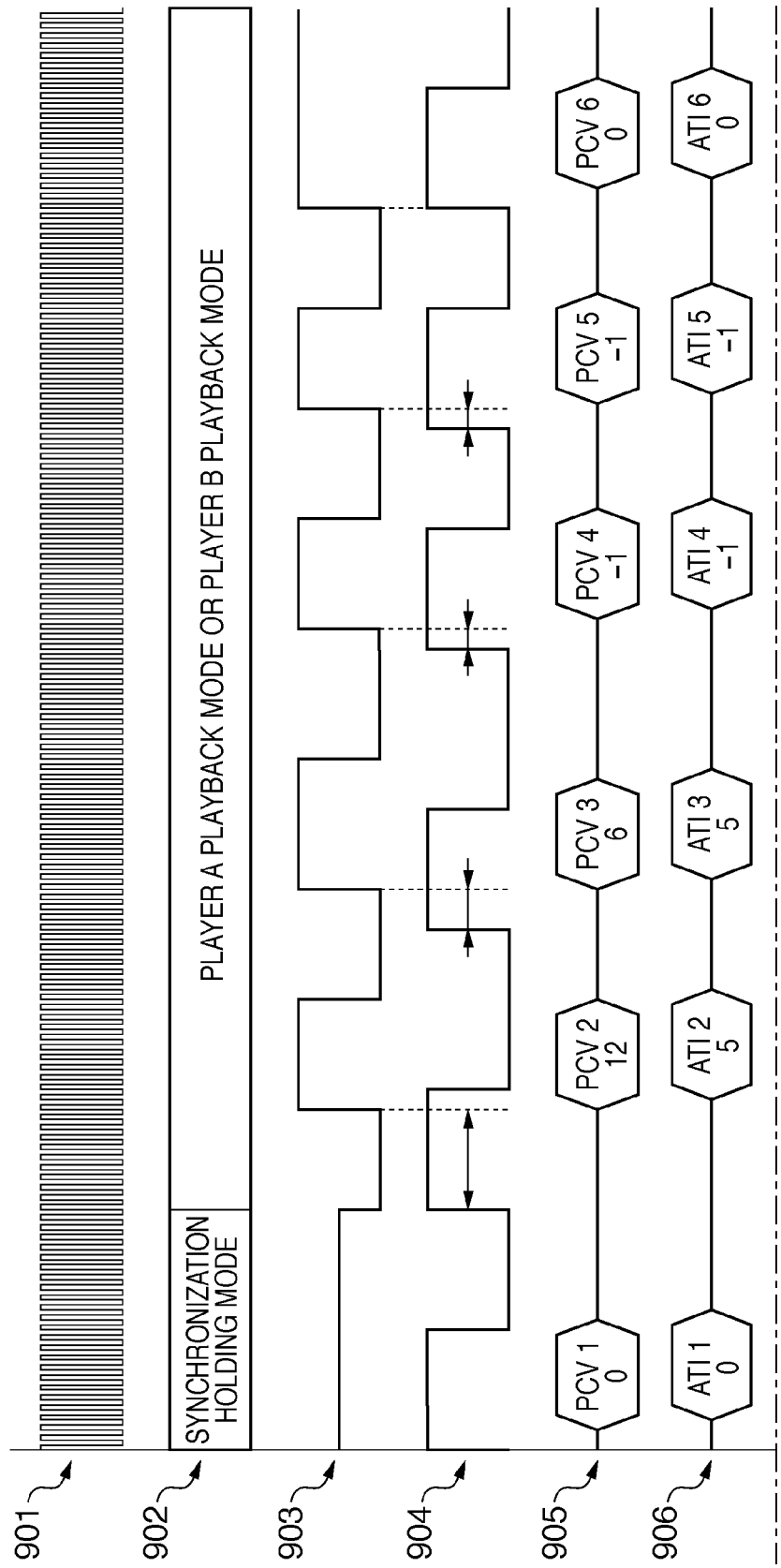

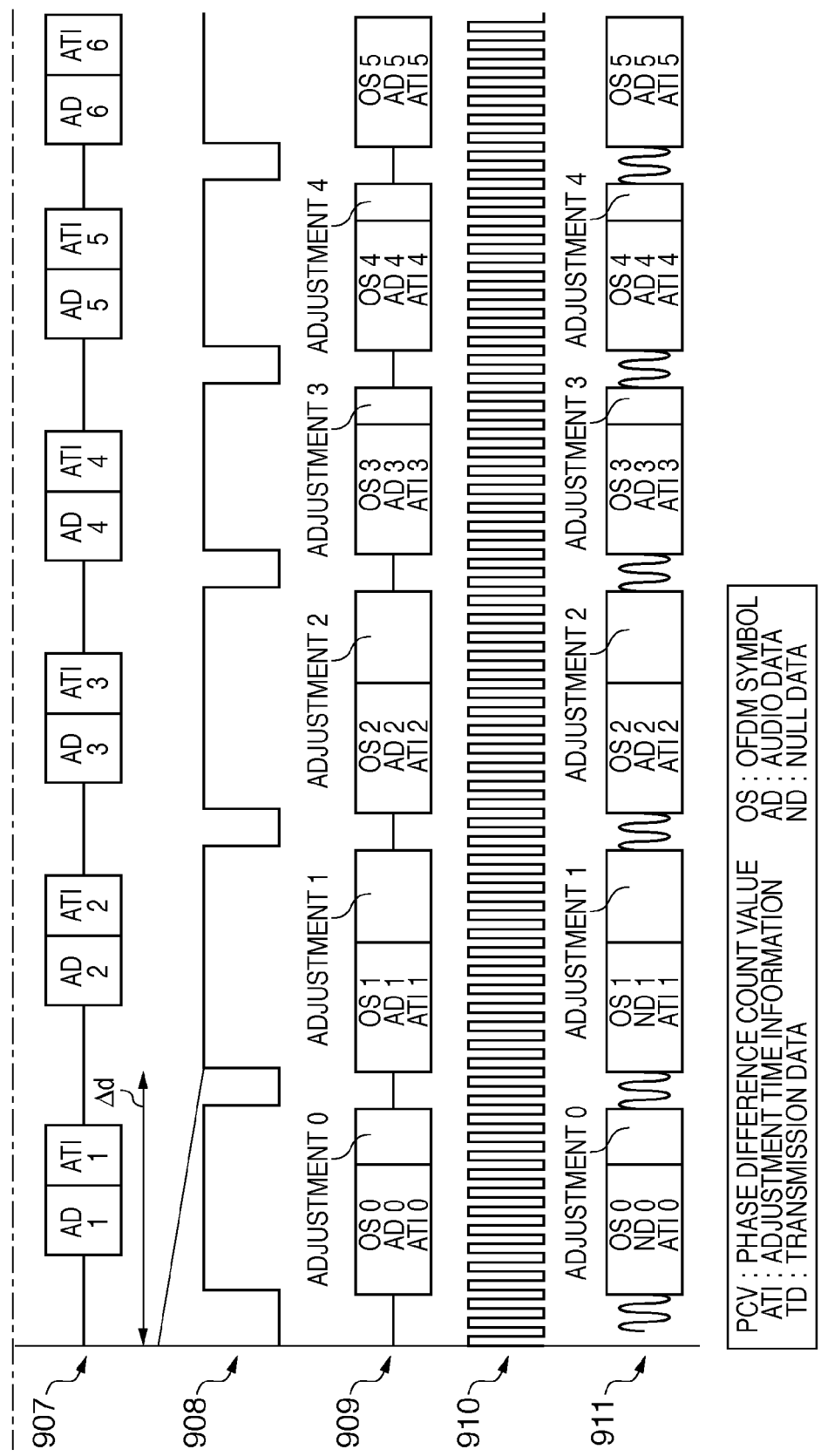

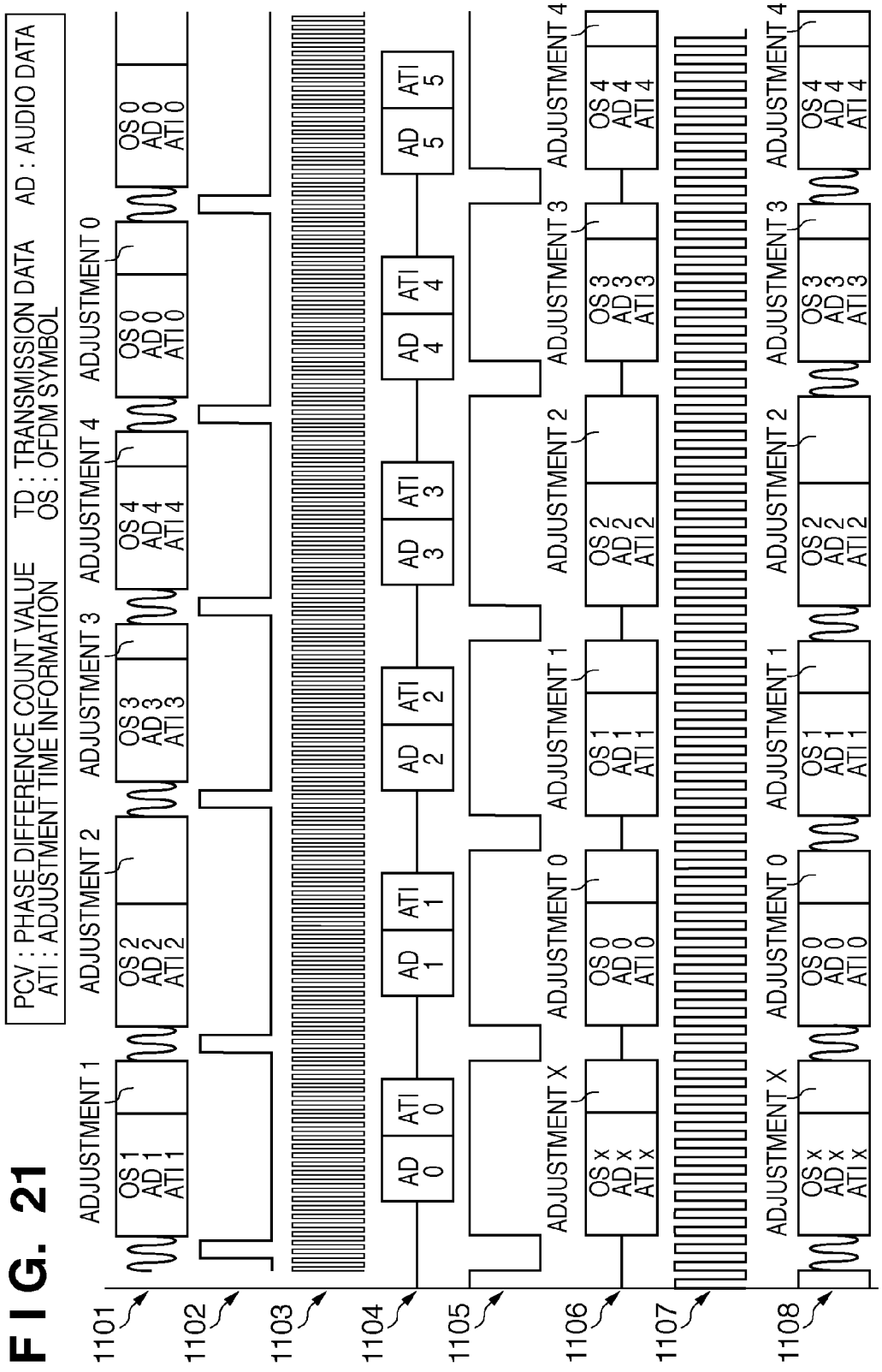

TRANSMISSION APPARATUS AND METHOD

CROSS REFERENCE TO RELATED APPLICATION

This application is a divisional of U.S. application Ser. No. 12/425,448 filed on Apr. 17, 2009, the entire disclosure of which is hereby incorporated by reference herein.

BACKGROUND OF THE INVENTION

1. Field of the Invention

The present invention relates to a transmission apparatus and method and, more particularly, to a transmission apparatus and method suitable for video or audio data transmission.

2. Description of the Related Art

There is a transmission apparatus which transmits data received from an input apparatus at a predetermined period as continuous frames having a predetermined structure. Such a transmission apparatus is useful for transmission of, for example, video or audio streaming data that requires punctual output. However, fluctuations in the data input period or deviations in the operation clock frequency between the input apparatus and the transmission apparatus generate a difference between the data input rate and the transmission rate. This leads to data loss or frame discontinuity, that is, an impediment to high-quality transmission of video or audio streaming data.

As a general measure to prevent this, a buffer memory is used to absorb the rate difference and level out the transmission rate. However, when data is input for a long time without interruption, uneven fluctuations in the data input period or deviations in the operation clock frequency between the input apparatus and the transmission apparatus cause overflow or underflow of the buffer memory.

This problem can be solved by using a technique disclosed in Japanese Patent Laid-Open No. 62-072251, which changes the length of a preamble included in a frame in accordance with the amount of data stored in the buffer memory.

However, the technique of Japanese Patent Laid-Open No. 62-072251 requires a buffer memory with a considerable capacity to execute processing according to the amount of stored data. This still causes a transmission delay.

Additionally, Japanese Patent Laid-Open No. 62-072251 discloses no operation for external device switching. In the arrangement of Japanese Patent Laid-Open No. 62-072251, the amount of data stored in the buffer memory may instantaneously increase or decrease due to a change of the data input timing upon switching the external device. This causes overflow or underflow of the buffer memory. To prevent this, it is necessary to prepare a buffer memory whose capacity is large enough to prevent overflow even when switching the external device, and perform the operation while storing, in the buffer memory, a sufficient amount of data to prevent underflow.

In this case, since the operation is executed while storing a considerable amount of data in the buffer memory, an unnecessary transmission delay occurs.

SUMMARY OF THE INVENTION

The present invention provides a technique for decreasing the necessary buffer memory capacity and reducing a transmission delay while maintaining a given transmission quality when data input at a predetermined period is transmitted as continuous frames having a predetermined structure.

The present invention also addresses problems that arise upon operation mode switching in a transmission apparatus which transmits a transmission frame including a variable length portion and a fixed length portion.

The present invention in one aspect provides a transmission apparatus comprising an input unit configured to input data at a predetermined period, a transmission signal generator configured to generate a transmission signal formed from a frame including a variable length portion whose length changes in accordance with fluctuations in the predetermined period of the data input by the input unit, and a fixed length portion containing data corresponding to n (n is a positive integer) times or 1/n of the predetermined period, and a transmitter configured to transmit the transmission signal generated by the transmission signal generator.

Further features of the present invention will become apparent from the following description of exemplary embodiments with reference to the attached drawings.

BRIEF DESCRIPTION OF THE DRAWINGS

FIG. 9 is a view for explaining adjustment data according to the second embodiment;

FIG. 14 is a view showing an example of the structure of a frame transmitted in the third embodiment;

FIG. 15 is a view showing an example of the structure of a data frame according to the third embodiment;

FIGS. 16A and 16B are timing charts showing timings in an initialization mode and a synchronization holding mode;

FIGS. 18A and 18B are timing charts showing transition from the synchronization holding mode to the player A playback mode;

FIGS. 19A and 19B are timing charts showing transition from the player A playback mode to the player B playback mode;

FIG. 21 is a timing chart of input/output and internal signals of the adapter according to the third embodiment.

DESCRIPTION OF THE EMBODIMENTS

Various exemplary embodiments, features, and aspects of the present invention will be described in detail below with reference to the drawings. The present invention is not limited by the disclosure of the embodiments and all combinations of the features described in the embodiments are not always indispensable to solving means of the present invention.

(First Embodiment)

A 5.1 channel audio system to which the present invention is applied will be described as an embodiment of the present invention.

Figure 2:
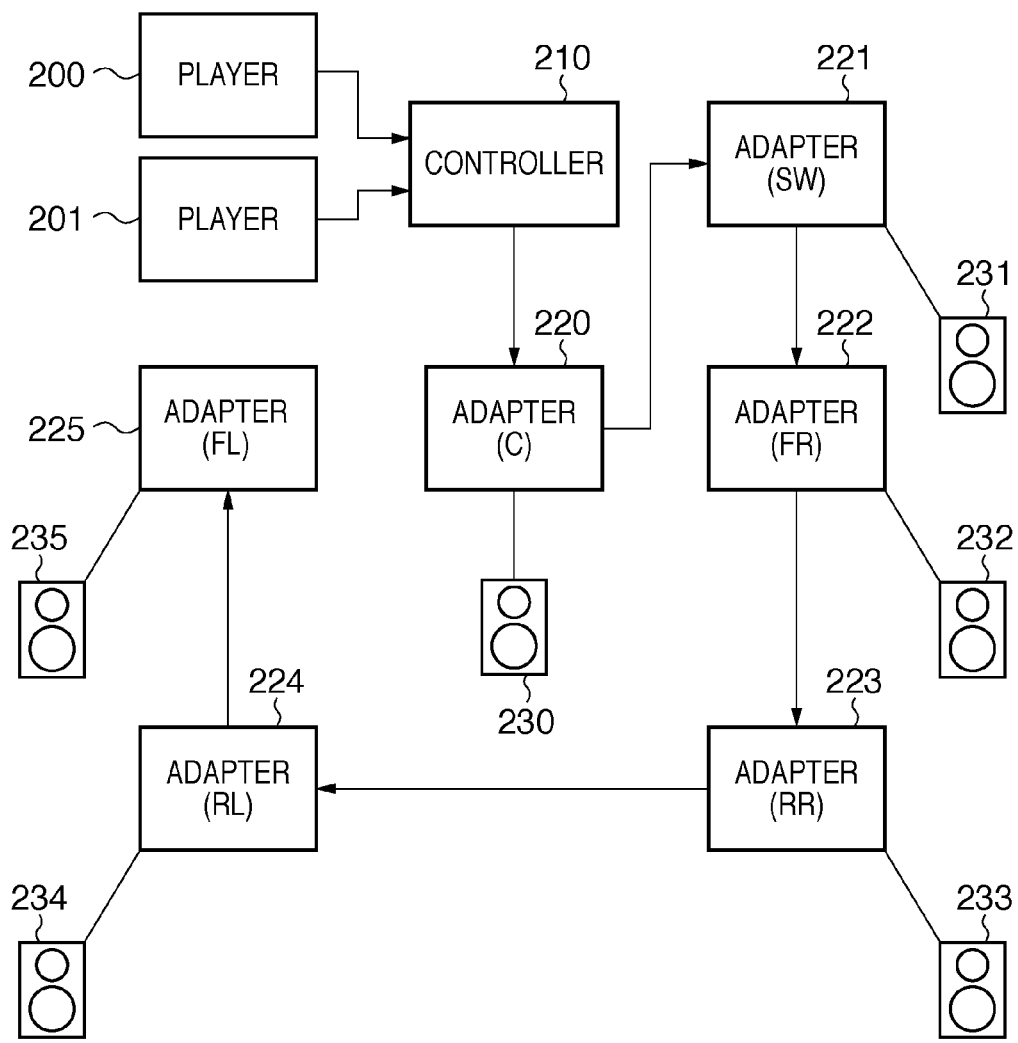
FIG. 2 is a block diagram showing the arrangement of a 5.1 channel audio system according to the first embodiment.

FIG. 2 is a block diagram showing an example of the arrangement of a 5.1 channel audio system according to the embodiment. Each of players 200 and 201 shown in FIG. 2 reads out multi-channel audio data from a recording medium such as an optical disk recording audio data, and outputs it as multi-channel audio data containing playback synchronizing data such as S/PDIF. In this embodiment, two players are used for the descriptive convenience. However, the number of players is not particularly limited if the system includes at least one player.

A controller 210 performs setup such as delay time adjustment or volume control in the system, selects, based on a user instruction transmits, one of audio data received from the players 200 and 201, and transmits it to adapters 220 to 225.

The adapters 220 to 225 receive the system setup data and audio data transmitted from the controller 210, and output the data to speakers 230 to 235 connected to them. The speakers 230 to 235 acoustically output the output signals from the adapters 220 to 225 connected to them.

The adapters 220 to 225 are assigned audio channels corresponding to the installation positions of the speakers 230 to 235. More specifically, the adapter 220 is assigned to a center (C) channel. The adapter 221 is assigned to a sub-woofer (SW) channel. The adapter 222 is assigned to a front right (FR) channel. The adapter 223 is assigned to a rear right (RR) channel. The adapter 224 is assigned to a rear left (RL) channel. The adapter 225 is assigned to a front left (FL) channel.

The players 200 and 201 are connected to the controller 210 via audio cables such as S/PDIF cables. The controller 210 and the adapters 220 to 225 are daisy-chained via cables. In this example, the controller 210 is connected to the adapter 220. The adapter 220 is connected to the adapter 221. The adapter 221 is connected to the adapter 222. The adapter 222 is connected to the adapter 223. The adapter 223 is connected to the adapter 224. The adapter 224 is connected to the adapter 225.

In the above-described arrangement, the adapter 220 receives the setup data and audio data transmitted from the controller 210 and transmits them to the adapter 221. The adapter 221 transmits the received data to the adapter 222. The setup data and audio data transmitted from the controller 210 are thus transmitted to the adapters 220, 221, 222, 223, 224, and 225 in this order.

Figure 1:
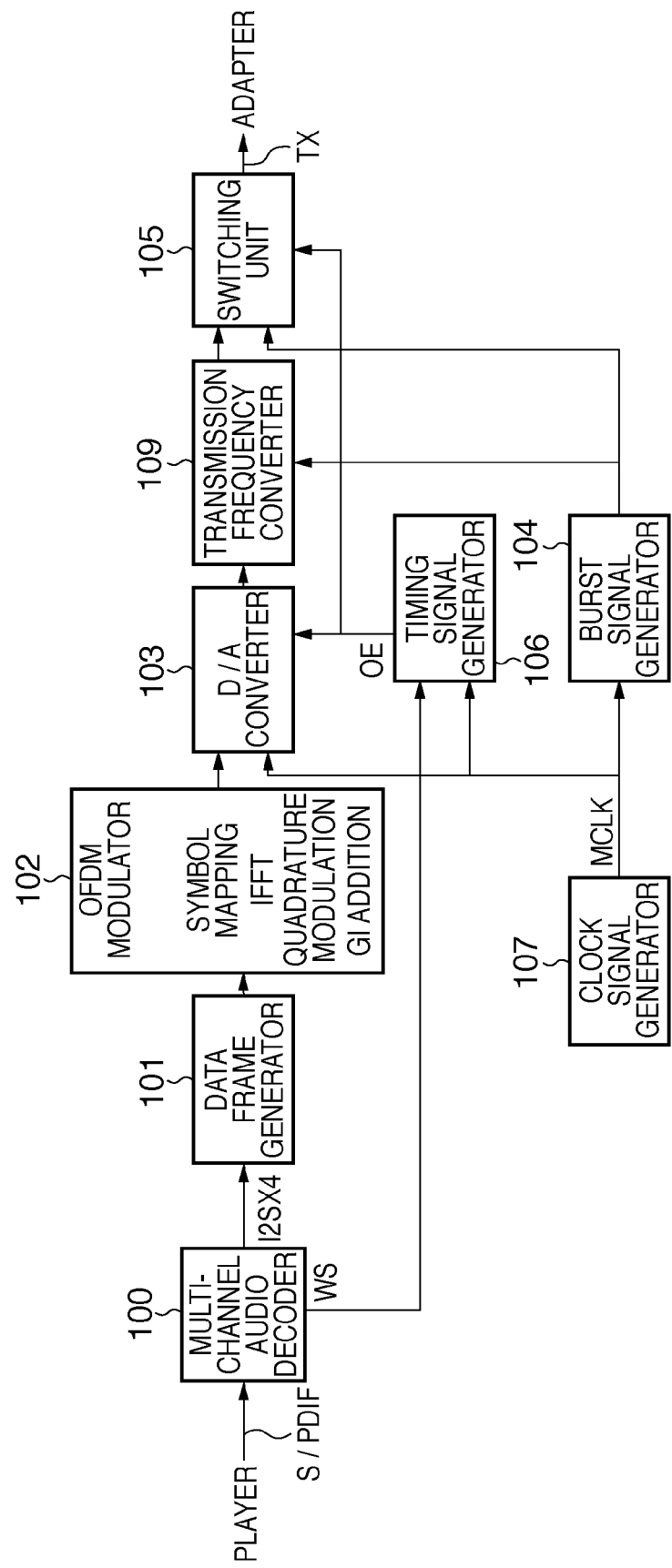
FIG. 1 is a block diagram showing the arrangement of a controller according to the first embodiment.
Figure 3:
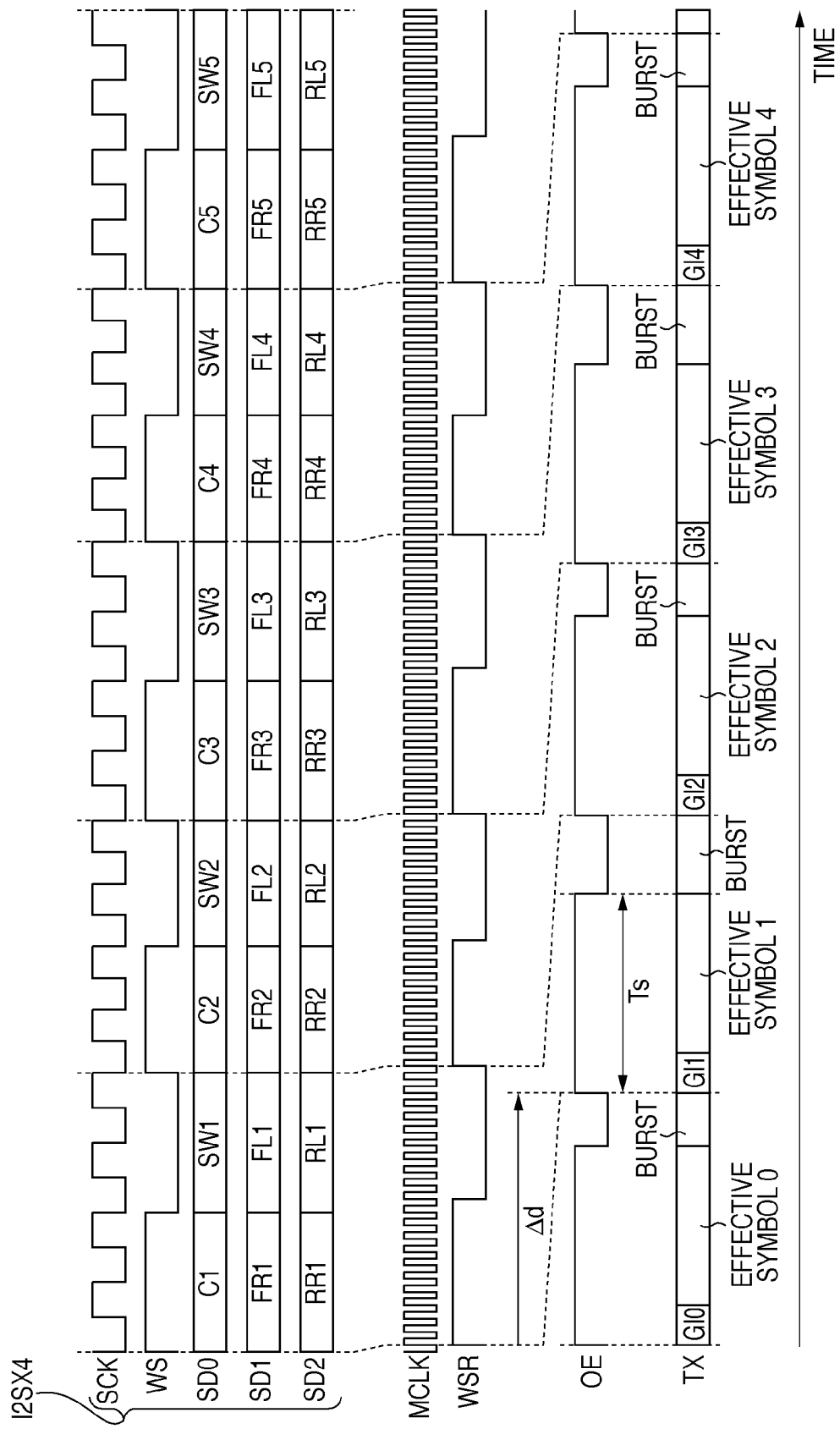
FIG. 3 is a timing chart of input/output and internal signals of the controller according to the first embodiment.

The arrangement and operation of the controller 210 will be described with reference to FIGS. 1 and 3. FIG. 1 is a block diagram of the controller 210. FIG. 3 is a timing chart of input/output and internal signals of the controller 210.

A multi-channel audio decoder 100 decodes multi-channel audio data which is output from the player 200 and contains, for example, S/PDIF playback synchronizing data, thereby generating a playback synchronizing signal and audio data in a PCM (Pulse Code Modulation) format for each channel. The playback synchronizing signal is generated from playback synchronizing data (the preamble of S/PDIF data) output from the player 200, and has the same period as the sampling period of the audio signal. The multi-channel audio decoder 100 outputs, to a data frame generator 101, the generated audio data in the PCM format for each channel including one sampling point per period of the playback synchronizing signal, together with the playback synchronizing signal. The playback synchronizing signal is also output to a timing signal generator 106.

The multi-channel audio decoder 100 can apply I2S to its output interface. I2SX4 in FIG. 3 is an output signal from the multi-channel audio decoder 100. SCK and WS correspond to a serial clock SCK (first clock signal) and word select WS of I2S, respectively. SD0 to SD2 correspond to serial data SD. The data of the C channel and SW channel are output to SD0. The data of the FR channel and FL channel are output to SD1. The data of the RR channel and RL channel are output to SD2. In this case, the signal WS corresponds to the playback synchronizing signal (first synchronizing signal).

Note that temporal fluctuations in the output of playback synchronizing data lead to fluctuations in the period of the playback synchronizing signal because the playback synchronizing signal is generated from playback synchronizing data in the multi-channel audio data output from the player 200.

Figure 4:
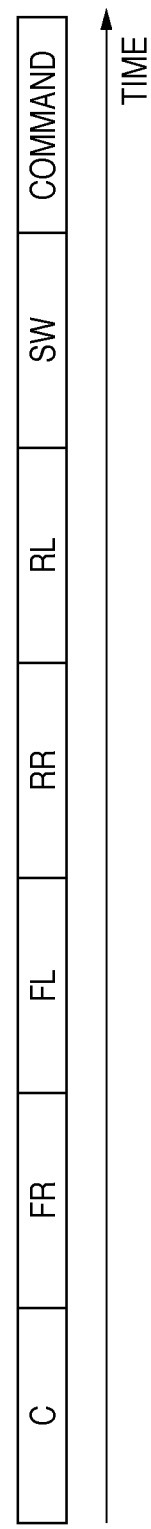
FIG. 4 is a view showing an example of the structure of a data frame generated in the first embodiment.

The data frame generator 101 generates a data frame having a structure shown in FIG. 4 from the signal I2SX4 received from the multi-channel audio decoder 100 for each predetermined period, for example, for each period (first period) of the signal WS. Regions C, FR, FL, RR, RL, and SW in FIG. 4 are the data regions of the C channel, FR channel, FL channel, RR channel, RL channel, and SW channel, respectively. Commands for the adapters 220 to 225 are arranged in a command region. The data frame generator 101 outputs the generated data frame to an OFDM modulator 102.

The OFDM modulator 102 modulates the data frame received from the data frame generator 101 by OFDM (Orthogonal Frequency Division Multiplexing) to generate OFDM symbol data including an effective symbol portion and a guard interval portion, and outputs it to a D/A converter 103. At this time, the OFDM modulator 102 generates one OFDM symbol data from one data frame.

The D/A converter 103 operates in synchronism with a clock signal MCLK output from a clock signal generator 107. When an output enable signal OE output from the timing signal generator 106 is at H (High) level, the D/A converter 103 D/A-converts the OFDM symbol data received from the OFDM modulator 102 to generate an intermediate frequency OFDM signal. At this time, the D/A converter 103 D/A-converts one OFDM symbol data in the H duration of one signal OE. The D/A converter 103 outputs the generated intermediate frequency signal (intermediate frequency OFDM signal) to a transmission frequency converter 109.

A burst signal generator 104 operates in synchronism with the signal MCLK output from the clock signal generator 107. The burst signal generator 104 divides the frequency of the signal MCLK output from the clock signal generator 107, filters the signal to generate a sinusoidal signal (to be referred to as a burst signal hereinafter) having the same frequency as the carrier frequency, and outputs it to the transmission frequency converter 109 and a switching unit 105. The generated burst signal forms a variable length portion arranged adjacent to an effective symbol or its guard interval contained in a fixed length portion.

When the signal OE output from the timing signal generator 106 is at H level, the switching unit 105 outputs the carrier frequency signal (carrier frequency OFDM signal) output from the transmission frequency converter 109 to the transmission path to the adapter 220. When the signal OE output from the timing signal generator 106 is at L (Low) level, the switching unit 105 outputs the burst signal output from the burst signal generator 104 to the transmission path to the adapter 220.

The timing signal generator 106 operates in synchronism with the signal MCLK output from the clock signal generator 107. The timing signal generator 106 reclocks the signal WS output from the multi-channel audio decoder 100 by the signal MCLK output from the clock signal generator 107, thereby generating a signal WSR having the second period as a second synchronizing signal. The timing signal generator 106 generates the signal OE which rises after the elapse of a predetermined time Δd from the leading edge of the signal WSR, and falls after the elapse of the time length Ts of the OFDM symbol data. The timing signal generator 106 outputs the signal OE to the D/A converter 103 and the switching unit 105. Process delays in the D/A converter 103 and the transmission frequency converter 109 are ignored here for descriptive convenience. If process delays occur in these units, the signal OE to be output to the switching unit 105 is delayed by the process delay time with respect to the signal OE to be output to the D/A converter 103, needless to say. The time Δd is decided such that audio data output from the multi-channel audio decoder 100 at a given WS signal period can be output as a transmission signal TX at the period of the signal WSR corresponding to the signal WS. The time Δd has at least a length equal to the time necessary from the start of the audio data output from the multi-channel audio decoder 100 to the input to the D/A converter 103. When a suffix i matches a suffix j in Ci, SWi, FRi, FLi, RRi, and RLi (i is an integer) of the signals SD0, SD1, and SD2, and GIj and effective symbol j (j is an integer) of the signal TX in FIG. 3, it indicates data or a signal based on the same audio data. More specifically, for example, C1, SW1, FR1, FL1, RR1, and RL1 of the signals SD0, SD1, and SD2 are output as a signal TX GI1 and an effective symbol 1. Data or signals based on the same audio data are thus represented using the suffixes throughout the remaining drawings.

The clock signal generator 107 generates the signal MCLK as a second clock signal, and outputs it to the D/A converter 103, the burst signal generator 104, and the timing signal generator 106. The signal MCLK is a clock signal which is generated from a clock source independently of that of the player 200 and has sufficiently small jitter suitable for an OFDM modulation/demodulation system.

Attention should be given to the following point. The controller 210 actually uses the player 200 as a clock source in processing associated with reception from the player 200. In processing associated with transmission to the adapter 220, however, the controller 210 uses a clock signal generated independently in it. This produces a frequency deviation between the clocks. Hence, the period of the signal WSR fluctuates even in the absence of fluctuations in the period of the signal WS.

The transmission frequency converter 109 converts the intermediate frequency OFDM signal output from the D/A converter 103 into a carrier frequency using the burst signal output from the burst signal generator 104, thereby generating a carrier frequency OFDM signal. The transmission frequency converter 109 outputs the generated carrier frequency OFDM signal to the switching unit 105.

As a result of the operations of these units, the transmission signal TX sent to the adapter 220 has a frame period almost equal to that of the signal WS actually synchronized with the clock of the player 200, including fluctuations. The frame includes an OFDM signal portion (including a guard interval portion and an effective symbol portion) that is a fixed length portion, and a burst signal portion that is a variable length portion whose length increases or decreases in accordance with the fluctuations of the signal WS or the signal WSR.

Figure 5:
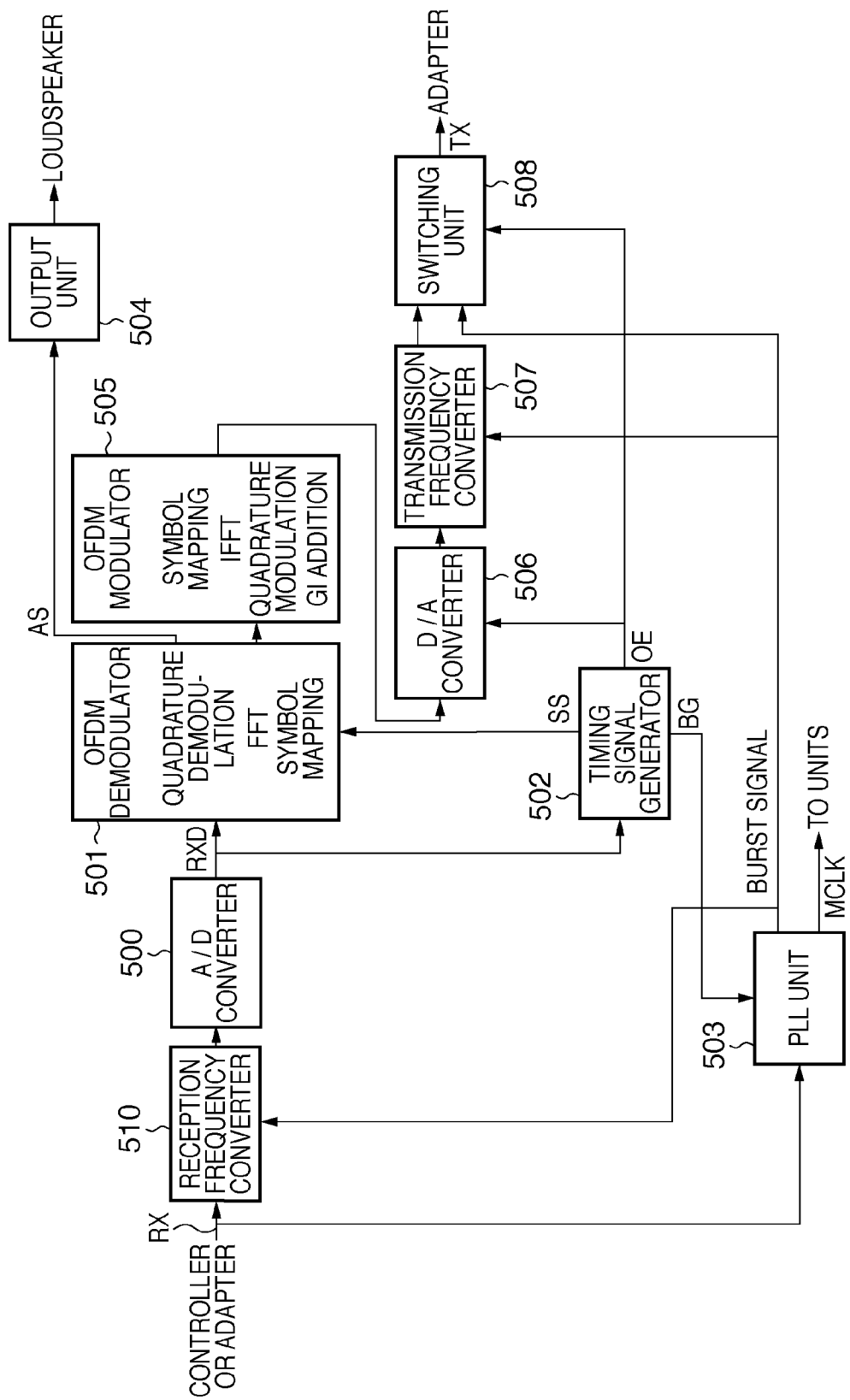
FIG. 5 is a block diagram showing the arrangement of an adapter according to the first embodiment.
Figure 6:
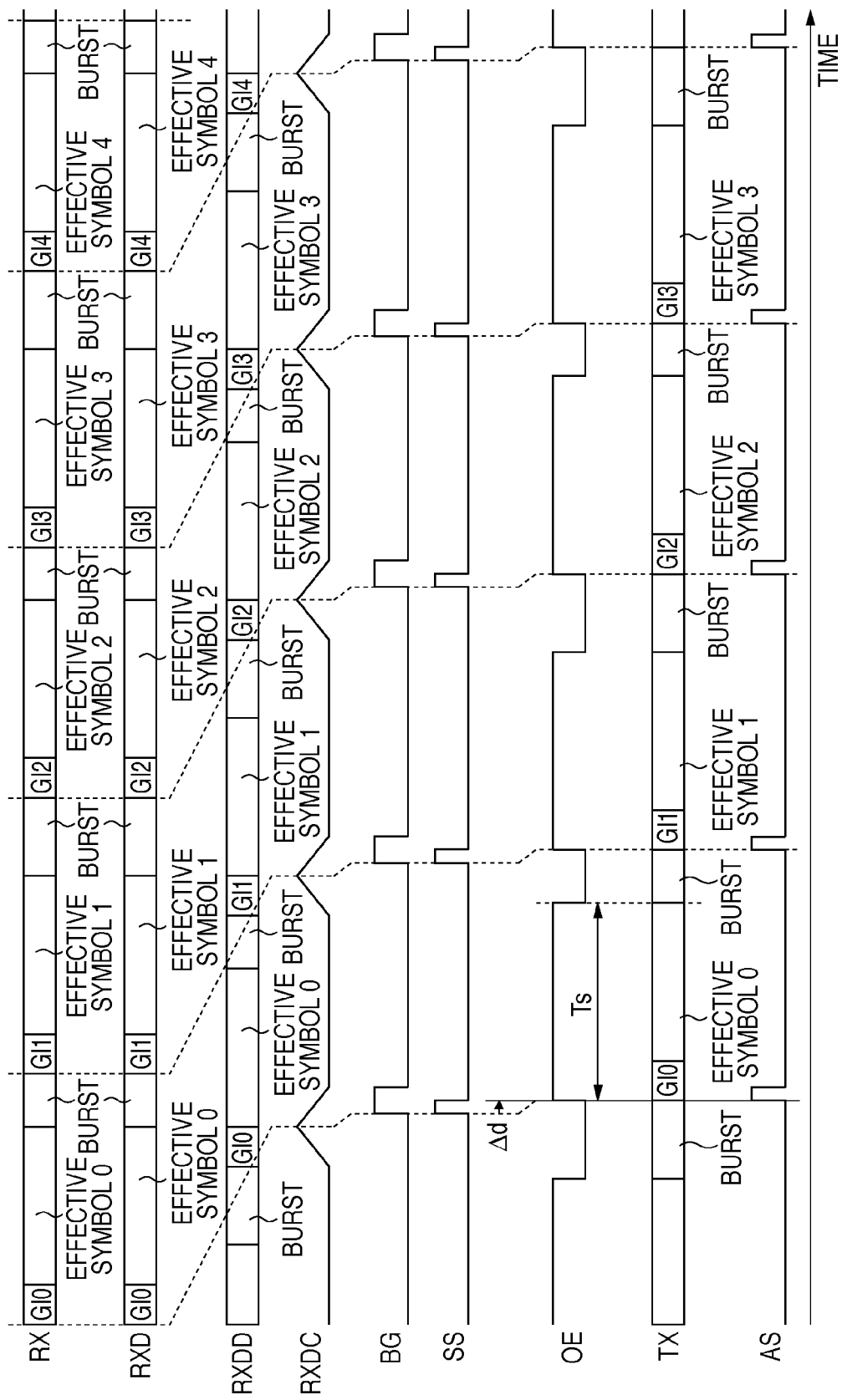
FIG. 6 is a timing chart of input/output and internal signals of the adapter according to the first embodiment.

The arrangement and operation of the adapters 220 to 225 will be described next with reference to FIGS. 5 and 6. FIG. 5 is a block diagram of the adapters 220 to 225. FIG. 6 is a timing chart of input/output and internal signals of the adapters 220 to 225.

An A/D converter 500 analog/digital-converts (A/D-converts) an intermediate frequency reception signal output from a reception frequency converter 510 to generate a digital reception signal RXD, and outputs it to an OFDM demodulator 501 and a timing signal generator 502.

The OFDM demodulator 501 OFDM-demodulates the signal RXD received from the A/D converter 500 by acquiring symbol synchronization using a symbol synchronizing signal SS output from the timing signal generator 502, thereby acquiring a data frame (FIG. 4). The OFDM demodulator 501 outputs the acquired data frame to an output unit 504 together with a playback synchronizing signal AS. The signal AS is generated from the signal SS output from the timing signal generator 502, and has the same period as that of the signal SS, including fluctuations. The OFDM demodulator 501 outputs audio data received in a given frame of a signal RX at the period of the signal AS corresponding to the frame. At this time, the relationship between the period of the signal WSR and the period of the signals SD0, SD1, and SD2 in the controller 210 is reproduced as that between the periods of the data and the signal AS output from the OFDM demodulator 501. The OFDM demodulator 501 outputs the acquired data frame to an OFDM modulator 505, too.

The timing signal generator 502 generates a burst gate signal BG, the signal SS, and the output enable signal OE based on the signal RXD output from the A/D converter 500, and outputs them to a PLL unit 503, the OFDM demodulator 501, and a D/A converter 506 and a switching unit 508, respectively. As is widely known as a symbol synchronization method in an OFDM modulation/demodulation system, the signal SS can be generated based on a correlation signal RXDC between the signal RX and a signal RXDD obtained by delaying the signal RX by its effective symbol length. The signal SS rises upon detecting the peak of the signal RXDC and falls one clock later. The signal BG and the signal OE can also be generated based on the signal RXDC. The signal BG rises upon detecting the peak of the signal RXDC, holds H level for a duration equal to or shorter than a predetermined minimum burst signal length, and then falls. Note that the minimum burst signal length can be decided based on the temporal fluctuation width of the playback synchronizing data output from the player 200. The signal OE rises after the elapse of the predetermined time Δd from detection of the peak of the signal RXD, and falls after the elapse of the OFDM symbol time length Ts. The time Δd has at least a length necessary for the signal RXD to be OFDM-demodulated by the OFDM demodulator 501 and input to the D/A converter 506. Process delays in the D/A converter 506 and a transmission frequency converter 507 are ignored here for the descriptive convenience. If process delays occur in these units, the signal OE to be output to the switching unit 508 is delayed by the process delay time with respect to the signal OE to be output to the D/A converter 506, needless to say.

The PLL unit 503 extracts a burst signal from the signal RX output from the controller 210 or an adapter connected upstream using the signal BG output from the timing signal generator 502 as a window signal. Then, the PLL unit 503 generates continuous burst signals in phase with the extracted burst signal by PLL (Phase-Locked Loop). The PLL unit 503 outputs the generated burst signal to the reception frequency converter 510 and the A/D converter 500, the transmission frequency converter 507, and the switching unit 508. The PLL unit 503 also multiplies the generated burst signal to generate the clock signal MCLK. The PLL unit 503 supplies the generated signal MCLK to the units of the adapter. The units of the adapter operate in synchronism with the signal MCLK. That is, the adapters 220 to 225 use the burst signal to synchronize the operation clock or the frequency in OFDM modulation/demodulation processing (carrier frequency synchronization or sampling frequency synchronization).

The output unit 504 extracts the audio data of the self channel from the data frame received from the OFDM demodulator 501, D/A-converts the audio data based on the signal AS, amplifies it to generate an audio signal, and outputs it to the loudspeaker. At this time, the output unit 504 corrects the data arrival time difference between the adapters, that is, delays audio signal output in accordance with the adapter of the latest data arrival so as to obtain a correct sound. The output unit 504 may generate a signal having a period obtained by averaging the signals AS over a plurality of periods, and output the audio signal based on the generated signal.

The OFDM modulator 505 OFDM-modulates the data frame received from the OFDM demodulator 501 to generate OFDM symbol data including an effective symbol portion and a guard interval portion, and outputs it to the D/A converter 506. At this time, the OFDM modulator 505 generates one OFDM symbol data from one data frame.

When the signal OE output from the timing signal generator 502 is at H level, the D/A converter 506 D/A-converts the OFDM symbol data received from the OFDM modulator 505 to generate an intermediate frequency OFDM signal, and outputs it to the transmission frequency converter 507. At this time, the D/A converter 506 D/A-converts one OFDM symbol data in the H duration of one signal OE.

The transmission frequency converter 507 converts the intermediate frequency OFDM signal output from the D/A converter 506 into a carrier frequency using the burst signal output from the PLL unit 503, thereby generating a carrier frequency OFDM signal. The transmission frequency converter 507 outputs the generated carrier frequency OFDM signal to the switching unit 508.

When the signal OE output from the timing signal generator 502 is at H level, the switching unit 508 outputs the carrier frequency OFDM signal output from the transmission frequency converter 507 to the transmission path. When the signal OE output from the timing signal generator 502 is at L level, the switching unit 508 outputs the burst signal output from the PLL unit 503 to the transmission path to the adapter connected downstream.

The reception frequency converter 510 receives the transmission signal RX output from the controller 210 or the adapter connected upstream, and converts it into an intermediate frequency using the burst signal output from the PLL unit 503, thereby generating an intermediate frequency reception signal. The reception frequency converter 510 outputs the generated intermediate frequency reception signal to the A/D converter 500.

As a result of the operations of these units, the transmission signal TX to the adapter connected downstream has a frame period equal to that of the reception signal received from the controller 210 or the adapter connected upstream, including fluctuations, and also has the same structure.

In this embodiment, the controller 210 transmits, in one frame, data corresponding to one period of the signal WS. Data corresponding to n (n is a positive integer) periods of the signal WS may be transmitted in one frame. To do this, the length of the burst signal portion is increased or decreased in accordance with fluctuations over a plurality of periods, that is, every n periods of the signal WS, thereby making the plurality of periods of the signal WS almost match the frame period, including the fluctuations. In this case, the output unit 504 of each of the adapters 220 to 225 generates a signal by multiplying the signal AS corresponding to the signal WS by n, or by averaging, over a plurality of periods, signals obtained by multiplying the signal AS by n, and outputs the audio signal based on the generated signal.

Alternatively, data corresponding to one period of the signal WS may be transmitted in a plurality of frames. That is, data corresponding to 1/n period of the signal WS may be transmitted in one frame. To do this, the length of the burst signal portion of at least one of a plurality of frames to transmit data corresponding to one period of the signal WS is increased or decreased in accordance with fluctuations in every period of the signal WS, thereby making the period of the signal WS almost match the length of the plurality of frame periods, including the fluctuations. In this case, the output unit 504 of each of the adapters 220 to 225 outputs the audio signal based on a signal corresponding to n periods of the signal AS corresponding to the signal WS, or a signal generated by averaging, over a plurality of periods, signals each corresponding to n periods of the signal AS.

In this embodiment, the period of the signal WS is the same as the sampling period of the audio signal. However, the period of the signal WS may be n times or 1/n (n is a positive integer) the sampling period of the audio signal. In this case, the output unit 504 of each of the adapters 220 to 225 executes audio signal output processing conforming to the output format of the multi-channel audio decoder 100 of the controller 210. For example, if the period of the signal WS is n times that of the audio signal, the output unit 504 outputs the audio signal based on a signal obtained by multiplying the signal AS corresponding to the signal WS by n, or by averaging, over a plurality of periods, signals obtained by multiplying the signal AS by n. If the period of the signal WS is 1/n that of the audio signal, the output unit 504 outputs the audio signal based on a signal corresponding to n periods of the signal AS corresponding to the signal WS, or a signal generated by averaging, over a plurality of periods, signals each corresponding to n periods of the signal AS.

This embodiment is useful when synchronization of the operation clock or the frequency in modulation/demodulation processing is necessary between the transmission and reception apparatuses because the frame includes the burst signal.

This embodiment is useful when it is difficult to change the length of the portion including significant data in data transmission because the length of the burst signal portion that is not the portion including significant data is increased or decreased.

For these reasons, this embodiment is useful when synchronization of the frequency in modulation/demodulation processing is necessary between the transmission and reception apparatuses, and it is difficult to change the length of the portion including significant data in data transmission, as in the OFDM modulation/demodulation method. In the OFDM modulation/demodulation method, the "portion including significant data" is the effective symbol.

In this embodiment, audio data transmission has been described as an example. However, the present invention is not limited to this, and is widely applicable to transmission of streaming data requiring punctuality, such as video data (sometimes accompanied with audio data) and various kinds of measurement data.

(Second Embodiment)

Another embodiment of the present invention will be described, in which the arrangements and operations of a controller 210 and adapters 220 to 225 in the 5.1 channel audio system shown in FIG. 2 are different from those of the first embodiment.

Figure 7:
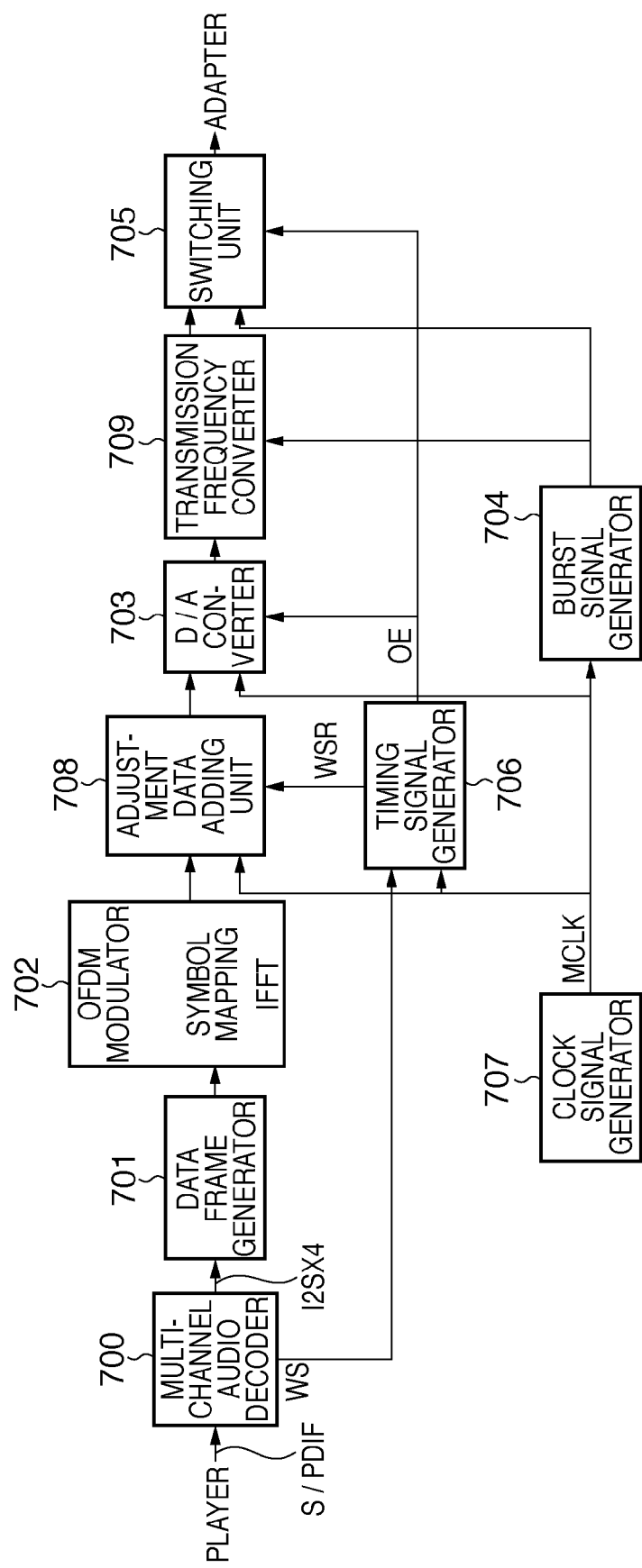
FIG. 7 is a block diagram showing the arrangement of a controller according to the second embodiment.
Figure 8:
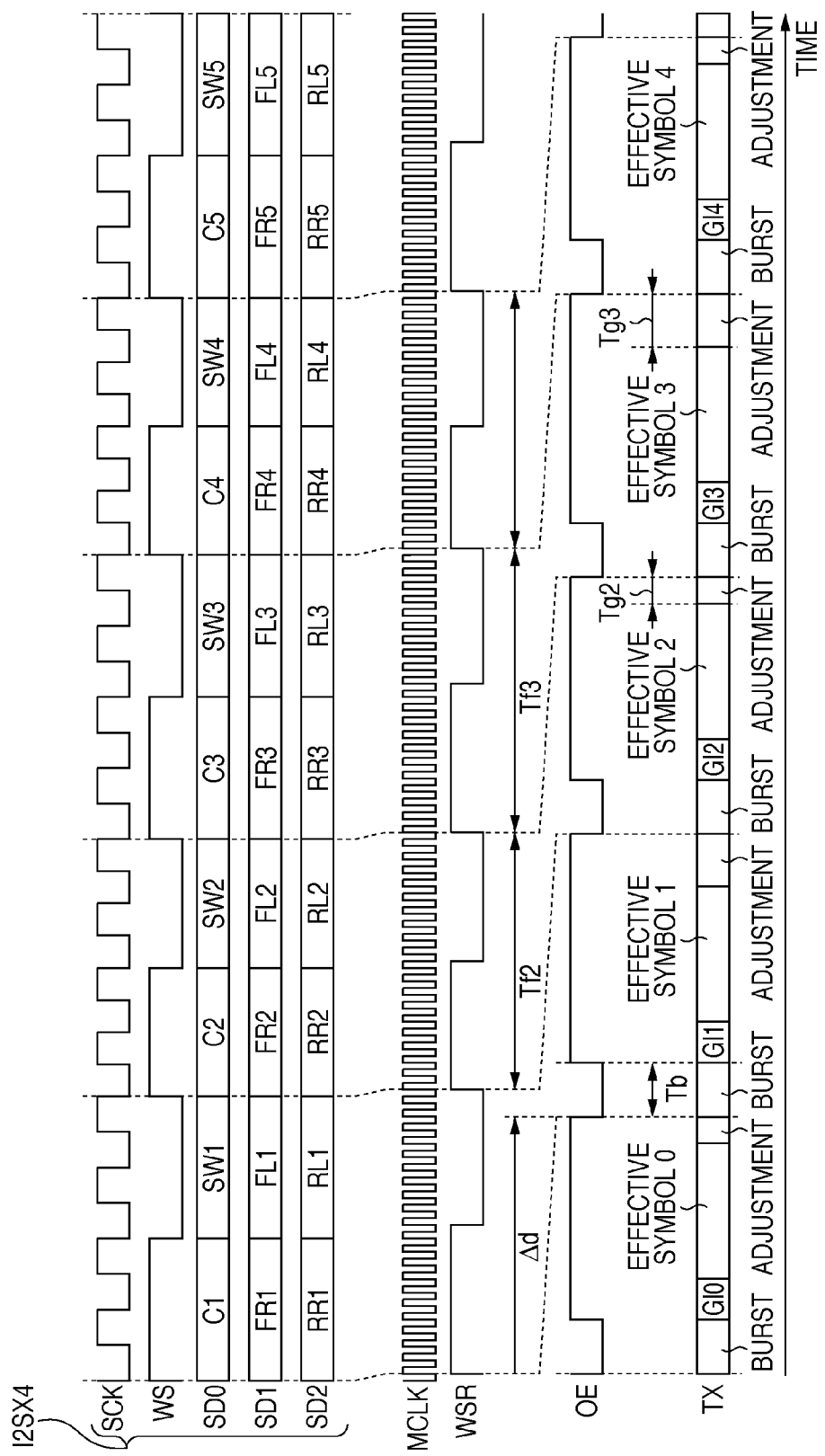
FIG. 8 is a timing chart of input/output and internal signals of the controller according to the second embodiment.

The arrangement and operation of the controller 210 will be described with reference to FIGS. 7 and 8. FIG. 7 is a block diagram of the controller 210. FIG. 8 is a timing chart of input/output and internal signals of the controller 210.

A multi-channel audio decoder 700 decodes multi-channel audio data which is output from a player 200 and contains, for example, S/PDIF playback synchronizing data, thereby generating a playback synchronizing signal and audio data in a PCM format for each channel. The playback synchronizing signal is generated from playback synchronizing data (the preamble of S/PDIF data) output from the player 200, and has the same period as the sampling period of the audio signal. The multi-channel audio decoder 700 outputs, to a data frame generator 701, the generated audio data in the PCM format for each channel including one sampling point per period of the playback synchronizing signal, together with the playback synchronizing signal. The playback synchronizing signal is also output to a timing signal generator 706.

The multi-channel audio decoder 700 can apply I2S to its output interface. I2SX4 in FIG. 8 is an output signal from the multi-channel audio decoder 700. SCK and WS correspond to a serial clock SCK and word select WS of I2S, respectively. SD0 to SD2 correspond to serial data SD. The data of the C channel and SW channel are output to SD0. The data of the FR channel and FL channel are output to SD1. The data of the RR channel and RL channel are output to SD2. In this case, the signal WS corresponds to the playback synchronizing signal.

Note that temporal fluctuations in the output of playback synchronizing data lead to fluctuations in the period of the playback synchronizing signal because the playback synchronizing signal is generated from playback synchronizing data in the multi-channel audio data output from the player 200.

The data frame generator 701 generates a data frame having a structure shown in FIG. 4 from the signal I2SX4 received from the multi-channel audio decoder 700 for each period of the signal WS. Regions C, FR, FL, RR, RL, and SW in FIG. 4 are the data regions of the C channel, FR channel, FL channel, RR channel, RL channel, and SW channel, respectively. Commands for the adapters 220 to 225 are arranged in a command region. The data frame generator 701 outputs the generated data frame to an OFDM modulator 702.

The OFDM modulator 702 modulates the data frame received from the data frame generator 701 by OFDM (Orthogonal Frequency Division Multiplexing) to generate OFDM symbol data including an effective symbol portion and a guard interval portion, and outputs it to an adjustment data adding unit 708. At this time, the OFDM modulator 702 generates one OFDM symbol data from one data frame.

A D/A converter 703 operates in synchronism with a clock signal MCLK output from a clock signal generator 707. When an output enable signal OE output from the timing signal generator 706 is at H (High) level, the D/A converter 703 digital/analog-converts (D/A-converts) the data received from the adjustment data adding unit 708, and outputs the data to a transmission frequency converter 709. At this time, the D/A converter 703 D/A-converts one OFDM symbol data added with adjustment data in the H duration of one signal OE.

A burst signal generator 704 operates in synchronism with the signal MCLK output from the clock signal generator 707. The burst signal generator 704 divides the frequency of the signal MCLK output from the clock signal generator 707, filters the signal to generate a sinusoidal signal (to be referred to as a burst signal hereinafter) having the same frequency as the carrier frequency, and outputs it to the transmission frequency converter 709 and a switching unit 705.

When the signal OE output from the timing signal generator 706 is at H level, the switching unit 705 outputs the signal output from the transmission frequency converter 709 to the transmission path to the adapter 220. When the signal OE output from the timing signal generator 706 is at L (Low) level, the switching unit 705 outputs the burst signal output from the burst signal generator 704 to the transmission path to the adapter 220.

The timing signal generator 706 operates in synchronism with the signal MCLK output from the clock signal generator 707. The timing signal generator 706 reclocks the signal WS output from the multi-channel audio decoder 700 by the signal MCLK output from the clock signal generator 707, thereby generating a signal WSR. The timing signal generator 706 outputs the generated signal WSR to the adjustment data adding unit 708. The timing signal generator 706 also generates the signal OE which falls after the elapse of a predetermined time Δd from the leading edge of the signal WSR, and rises after the elapse of a predetermined burst signal time length, and outputs it to the D/A converter 703 and the switching unit 705. The predetermined burst signal time length is represented by Tb. The time Δd is decided such that audio data output from the multi-channel audio decoder 700 at a given WS signal period can be output as a transmission signal TX at the period of the signal WSR corresponding to the signal WS. The time Δd has at least a length obtained by subtracting the burst signal length from the time necessary from the start of the audio data output from the multi-channel audio decoder 700 to the input to the D/A converter 703. Process delays in the D/A converter 703 and the transmission frequency converter 709 are ignored here for the descriptive convenience. If process delays occur in these units, the signal OE to be output to the switching unit 705 is delayed by the process delay time with respect to the signal OE to be output to the D/A converter 703, needless to say. When a suffix i matches a suffix j in Ci, SWi, FRi, FLi, RRi, and RLi (i is an integer) of the signals SD0, SD1, and SD2, and GIj and effective symbol j (j is an integer) of the signal TX in FIG. 8, it indicates data or a signal based on the same audio data. More specifically, for example, C1, SW1, FR1, FL1, RR1, and RL1 of the signals SD0, SD1, and SD2 are output as a signal TX GI1 and an effective symbol 1. Data or signals based on the same audio data are thus represented using the suffixes throughout the remaining drawings.

The clock signal generator 707 generates the signal MCLK, and outputs it to the D/A converter 703, the burst signal generator 704, the timing signal generator 706, and the adjustment data adding unit 708. The signal MCLK is a clock signal which is generated from a clock source independently of that of the player 200 and has sufficiently small jitter suitable for an OFDM modulation/demodulation system.

Attention should be given to the following point. The controller 210 actually uses the player 200 as a clock source in processing associated with reception from the player 200. In processing associated with transmission to the adapter 220, however, the controller 210 uses a clock signal generated in it.

This produces a frequency deviation between the clocks. Hence, the period of the signal WSR fluctuates even in the absence of fluctuations in the period of the signal WS.

The adjustment data adding unit 708 adds adjustment data having a length corresponding to the fluctuations in the period of the signal WSR output from the timing signal generator 706 to the OFDM symbol data received from the OFDM modulator 702, and outputs the data to the D/A converter 703. The adjustment data has a length corresponding to the increase/decrease amount of the period of the signal WSR, which is measured at every leading edge of it. For, for example, frame 3 in FIG. 8, the length of the adjustment data is increased by an increase amount (Tf3−Tf2) of the period of the signal WSR. Consequently, an increase amount (Tg3−Tg2) of the adjustment data becomes equal to (Tf3−Tf2). The amount of increase/decrease of the period of the signal WSR is obtained by counting the period length using the signal MCLK output from the clock signal generator 707 and comparing the count value of the current period with that of the immediately preceding period. Note that the minimum length of the adjustment data is decided to be 0 or more even when the signal WSR has the minimum period.

When the adjustment data uses the same data as the start portion of the effective symbol and is added after the effective symbol (FIG. 9), it is possible to effectively reduce demodulation errors caused by a symbol synchronization error in OFDM demodulation. In this embodiment, adjustment data uses the same data as the start portion of an effective symbol and is added after the effective symbol, unless it is specifically stated otherwise.

The transmission frequency converter 709 converts the signal output from the D/A converter 703 into a carrier frequency using the burst signal output from the burst signal generator 704, and outputs it to the switching unit 705.

As a result of the operations of these units, the transmission signal TX sent to the adapter 220 has a frame period almost equal to that of the signal WS actually synchronized with the clock of the player 200, including fluctuations. The frame includes a fixed length burst signal portion, an OFDM signal portion (including a guard interval portion and an effective symbol portion), and an adjustment data portion whose length increases or decreases in accordance with the fluctuations of the signal WS.

Figure 10:
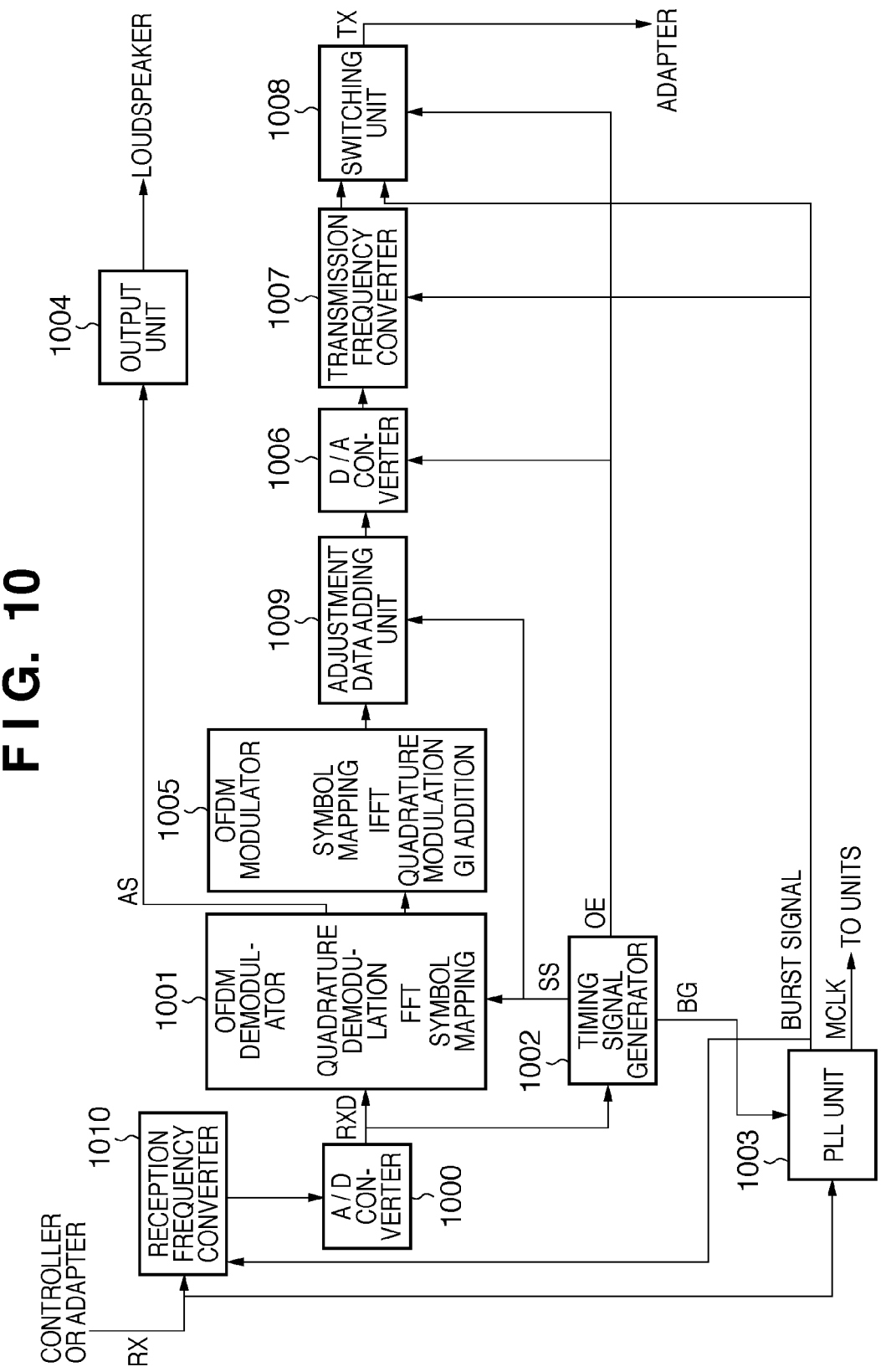
FIG. 10 is a block diagram showing the arrangement of an adapter according to the second embodiment.
Figure 11:
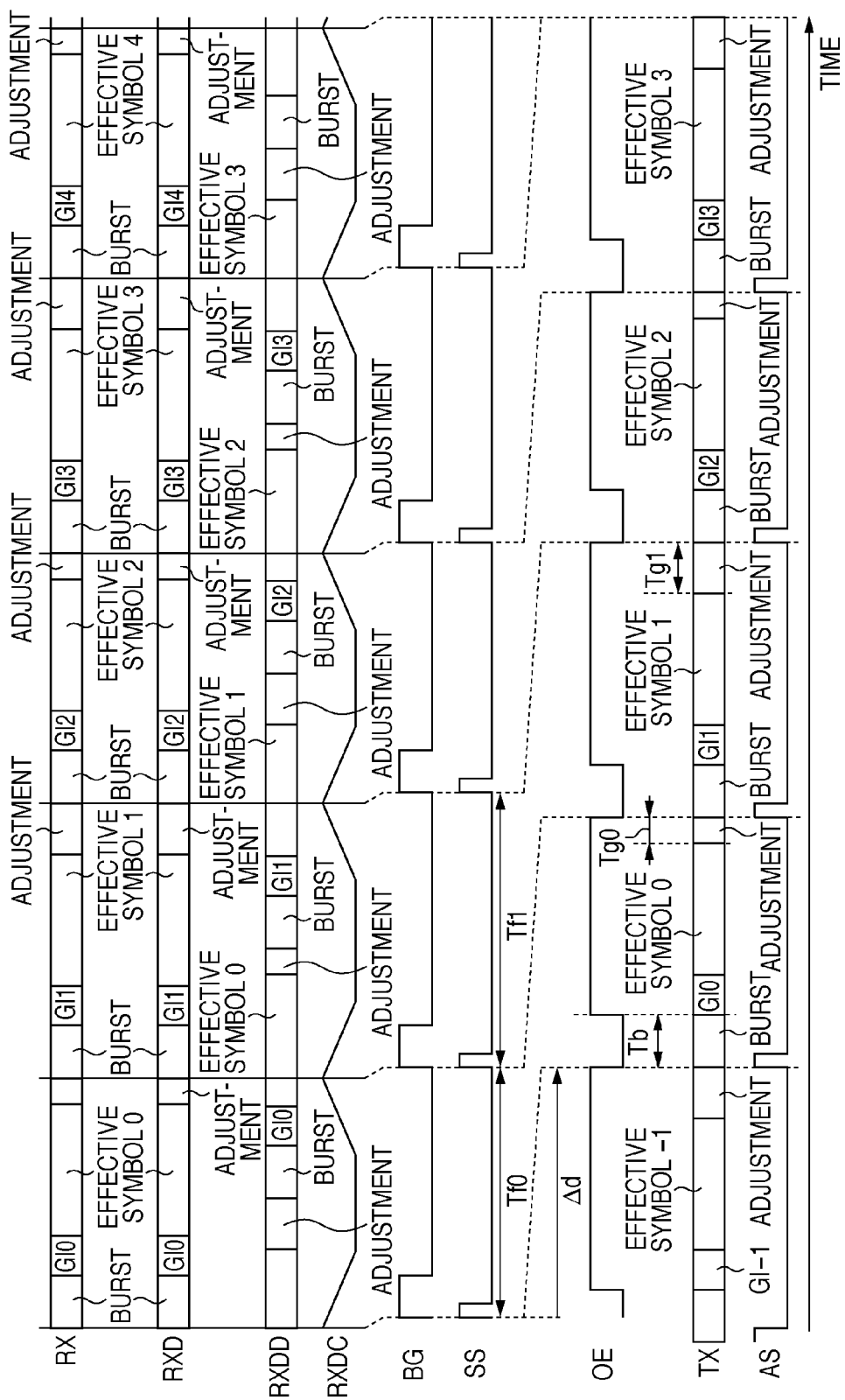
FIG. 11 is a timing chart of input/output and internal signals of the adapter according to the second embodiment.

The arrangement and operation of the adapters 220 to 225 will be described with reference to FIGS. 10 and 11. FIG. 10 is a block diagram of the adapters 220 to 225. FIG. 11 is a timing chart of input/output and internal signals of the adapters 220 to 225.

An A/D converter 1000 analog/digital-converts (A/D-converts) an intermediate frequency reception signal output from a reception frequency converter 1010 to generate a digital reception signal RXD, and outputs it to an OFDM demodulator 1001 and a timing signal generator 1002.

The OFDM demodulator 1001 OFDM-demodulates the signal RXD received from the A/D converter 1000 by acquiring symbol synchronization using a symbol synchronizing signal SS output from the timing signal generator 1002, thereby acquiring a data frame (FIG. 4). The leading edge of the signal SS does not match the start of the guard interval of the signal RXD, unlike a general OFDM modulation/demodulation system. However, since the burst signal length is fixed, symbol synchronization can be acquired using the signal SS. The OFDM demodulator 1001 outputs the acquired data frame to an output unit 1004 together with a playback synchronizing signal AS. The signal AS is generated from the signal SS output from the timing signal generator 1002, and has the same period as that of the signal SS, including fluctuations. The OFDM demodulator 1001 outputs audio data received in a given frame of a signal RX at the period of the signal AS corresponding to the frame. At this time, the relationship between the period of the signal WSR and the period of the signals SD0, SD1, and SD2 in the controller 210 is reproduced as that between the periods of the data and the signal AS output from the OFDM demodulator 1001. The OFDM demodulator 1001 outputs the acquired data frame to an OFDM modulator 1005, too.

The timing signal generator 1002 generates a burst gate signal BG, the signal SS, and the output enable signal OE based on the signal RXD output from the A/D converter 1000, and outputs them to a PLL unit 1003, the OFDM demodulator 1001 and an adjustment data adding unit 1009, and a D/A converter 1006 and a switching unit 1008, respectively. As is widely known as a symbol synchronization method in an OFDM modulation/demodulation system, the signal SS can be generated based on a correlation signal RXDC between the signal RX and a signal RXDD obtained by delaying the signal RX by its effective symbol length. At this time, it is effective to obtain a peak in the signal RXDC at a frame break. To do this, a technique disclosed in, for example, Japanese Patent No. 3807878 is usable. The signal SS rises upon detecting the peak of the signal RXDC and falls one clock later. The signal BG and the signal OE can also be generated based on the signal RXDC. The signal BG rises upon detecting the peak of the signal RXDC, holds H level up to the end of the burst signal duration, and then falls. The burst signal length is fixed. The signal OE falls after the elapse of the predetermined time Δd from detection of the peak of the signal RXD, and rises after the elapse of the burst signal time length Tb. The time Δd is decided such that audio data received in a frame of the signal RX can be output as the signal TX in a frame of a period corresponding to the frame. The time Δd has at least a length necessary for the signal RXD to be input to the OFDM demodulator 1001 and then input to the D/A converter 1006, in addition to the burst signal length. For example, GI1 and effective symbol 1 of the signal RX are output as GI1 and effective symbol 1 of the signal TX. Process delays in the D/A converter 1006 and a transmission frequency converter 1007 are ignored here for descriptive convenience. If process delays occur in these units, the signal OE to be output to the switching unit 1008 is delayed by the process delay time with respect to the signal OE to be output to the D/A converter 1006, needless to say. FIG. 11 is only a schematic view, and the waveform of the signal RXDC is different from the actual waveform except the peak positions.

The PLL unit 1003 extracts a burst signal from the signal RX output from the controller 210 or an adapter connected upstream using the signal BG output from the timing signal generator 1002 as a window signal. Then, the PLL unit 1003 generates continuous burst signals in phase with the extracted burst signal by PLL (Phase-Locked Loop). The PLL unit 1003 outputs the generated burst signal to the reception frequency converter 1010 and the A/D converter 1000, the transmission frequency converter 1007, and the switching unit 1008. The PLL unit 1003 also multiplies the generated burst signal to generate the clock signal MCLK. The PLL unit 1003 supplies the generated signal MCLK to the units of the adapter. The units of the adapter operate in synchronism with the signal MCLK. That is, the adapters 220 to 225 use the burst signal to synchronize the operation clock or the frequency in OFDM modulation/demodulation processing (carrier frequency synchronization or sampling frequency synchronization).

The output unit 1004 extracts the audio data of the self channel from the data frame received from the OFDM demodulator 1001, D/A-converts the audio data based on the signal AS, amplifies it to generate an audio signal, and outputs it to the loudspeaker. At this time, the output unit 1004 corrects the data arrival time difference between the adapters, that is, delays audio signal output in accordance with the adapter of the latest data arrival so as to obtain a correct sound. The output unit 1004 may generate a signal having a period obtained by averaging the signals AS over a plurality of periods, and output the audio signal based on the generated signal.

The OFDM modulator 1005 OFDM-modulates the data frame received from the OFDM demodulator 1001 to generate OFDM symbol data including an effective symbol portion and a guard interval portion, and outputs it to the adjustment data adding unit 1009. At this time, the OFDM modulator 1005 generates one OFDM symbol data from one data frame.

The D/A converter 1006 operates in synchronism with the clock signal MCLK output from the PLL unit 1003. When the output enable signal OE output from the timing signal generator 1002 is at H (High) level, the D/A converter 1006 D/A-converts the data received from the adjustment data adding unit 1009, and outputs it to the transmission frequency converter 1007. At this time, the D/A converter 1006 D/A-converts one OFDM symbol data added with adjustment data in the H duration of one signal OE.

The transmission frequency converter 1007 converts the signal output from the D/A converter 1006 into a carrier frequency using the burst signal output from the PLL unit 1003, and outputs it to the switching unit 1008.

When the signal OE output from the timing signal generator 1002 is at H level, the switching unit 1008 outputs the signal output from the transmission frequency converter 1007 to the transmission path to the adapter connected downstream. When the signal OE output from the timing signal generator 1002 is at L (Low) level, the switching unit 1008 outputs the burst signal output from the PLL unit 1003 to the transmission path to the adapter connected downstream.

The adjustment data adding unit 1009 adds adjustment data having a length corresponding to the fluctuations in the period of the signal SS output from the timing signal generator 1002 to the OFDM symbol data received from the OFDM modulator 1005, and outputs the data to the D/A converter 1006. The adjustment data has a length corresponding to the amount of increase/decrease of the period of the signal SS, which is measured at every leading edge of it. For, for example, frame 1 in FIG. 11, the length of the adjustment data is increased by an increase amount (Tf1−Tf0) of the period of the signal SS. Consequently, an increase amount (Tg1−Tg0) of the adjustment data becomes equal to (Tf1−Tf0). The amount of increase/decrease of the period of the signal SS is obtained by counting the period length using the signal MCLK output from the PLL unit 1003 and comparing the count value of the current period with that of the immediately preceding period. Note that the minimum length of the adjustment data is decided to be 0 or more even when the signal SS has the minimum period.

The reception frequency converter 1010 receives the transmission signal RX output from the controller 210 or the adapter connected upstream, and converts it into an intermediate frequency using the burst signal output from the PLL unit 1003, thereby generating an intermediate frequency reception signal. The reception frequency converter 1010 outputs the generated intermediate frequency reception signal to the A/D converter 1000.

As a result of the operations of these units, the transmission signal TX to the adapter connected downstream has a frame period equal to that of the reception signal received from the controller 210 or the adapter connected upstream, including fluctuations, and also has the same structure.

In this embodiment, the controller 210 transmits, in one frame, data corresponding to one period of the signal WS. Data corresponding to a plurality of periods of the signal WS may be transmitted in one frame. To do this, the length of the adjustment data portion is increased or decreased in accordance with fluctuations over a plurality of periods of the signal WS, thereby making the plurality of periods of the signal WS almost match the frame period, including the fluctuations. In this case, the output unit 1004 of each of the adapters 220 to 225 generates a signal by multiplying the signal AS corresponding to the signal WS by n, or by averaging, over a plurality of periods, signals obtained by multiplying the signal AS by n, and outputs the audio signal based on the generated signal.

Alternatively, data corresponding to one period of the signal WS may be transmitted in a plurality of frames. To do this, the length of the adjustment data portion of at least one of a plurality of frames to transmit data corresponding to one period of the signal WS is increased or decreased in accordance with fluctuations in every period of the signal WS, thereby making the period of the signal WS almost match the length of the plurality of frame periods, including the fluctuations. In this case, the output unit 1004 of each of the adapters 220 to 225 outputs the audio signal based on a signal corresponding to n periods of the signal AS corresponding to the signal WS, or a signal generated by averaging, over a plurality of periods, signals each corresponding to n periods of the signal AS.

In this embodiment, the period of the signal WS is the same as the sampling period of the audio signal. However, the period of the signal WS may be n times or 1/n (n is a positive integer) the sampling period of the audio signal. In this case, the output unit 1004 of each of the adapters 220 to 225 executes audio signal output processing conforming to the output format of the multi-channel audio decoder 700 of the controller 210. For example, if the period of the signal WS is n times that of the audio signal, the output unit 1004 outputs the audio signal based on a signal obtained by multiplying the signal AS corresponding to the signal WS by n, or by averaging, over a plurality of periods, signals obtained by multiplying the signal AS by n. If the period of the signal WS is 1/n that of the audio signal, the output unit 1004 outputs the audio signal based on a signal corresponding to n periods of the signal AS corresponding to the signal WS, or a signal generated by averaging, over a plurality of periods, signals each corresponding to n periods of the signal AS.

In this embodiment, the adjustment data uses the same data as the start portion of the effective symbol and is added after the effective symbol. The adjustment data may be arbitrary data or null data (no signal), and may be inserted into an arbitrary point. For example, the adjustment data may be added before the guard interval so as to function as a part of the guard interval. This actually amounts to increasing or decreasing the guard interval length in accordance with the fluctuations in the signal WS.

This embodiment is useful when synchronization of the operation clock or the frequency in modulation/demodulation processing is necessary between the transmission and reception apparatuses because the frame includes the burst signal.

This embodiment is useful when it is difficult to change the length of the portion including significant data in data transmission because a portion including no significant data in data transmission is provided separately from the portion including significant data, and the length of the portion is increased or decreased.

For these reasons, this embodiment is useful when synchronization of the frequency in modulation/demodulation processing is necessary between the transmission and reception apparatuses, and it is difficult to change the length of the portion including significant data in data transmission, as in the OFDM modulation/demodulation method. In the OFDM modulation/demodulation method, the "portion including significant data" is the effective symbol.

In this embodiment, audio data transmission has been described as an example. However, the present invention is not limited to this, and is widely applicable to transmission of streaming data requiring punctuality, such as video data (sometimes accompanied with audio data) and various kinds of measurement data. In the first and second embodiments, the controller 210 and the adapters 220 to 225 are daisy-chained via cables. However, the present invention is not limited to this. The devices may be connected via buses. In this case, each of the adapters 220 to 225 can omit transmission processing to an adapter connected downstream. Additionally, the output units 504 and 1004 can omit processing of correcting the data arrival time difference between the adapters.

(Third Embodiment)

Japanese Patent Laid-Open No. 62-072251 described above discloses no operation for external device switching. In the arrangement of Japanese Patent Laid-Open No. 62-072251, the data amount stored in the buffer memory may instantaneously increase or decrease due to a change of the data input timing upon switching the external device. This causes overflow or underflow of the buffer memory. To prevent this, it is necessary to prepare a buffer memory whose capacity is large enough to prevent overflow even when switching the external device, and perform the operation while storing, in the buffer memory, a sufficient amount of data to prevent underflow.

In this case, since the operation is executed while storing a considerable amount of data in the buffer memory, an unnecessary transmission delay occurs.

This embodiment solves problems that arise upon operation mode switching in a transmission apparatus which transmits a transmission frame including a variable length portion and a fixed length portion.

The 5.1 channel audio system shown in FIG. 2 has four operation modes: initialization mode, player A playback mode, player B playback mode, and synchronization holding mode. The four operation modes will be described here using a state transition chart in FIG. 13.

The player A playback mode is a playback mode to cause a player 200 to perform playback. The player B playback mode is a playback mode to cause a player 201 to perform playback.

Figure 13:
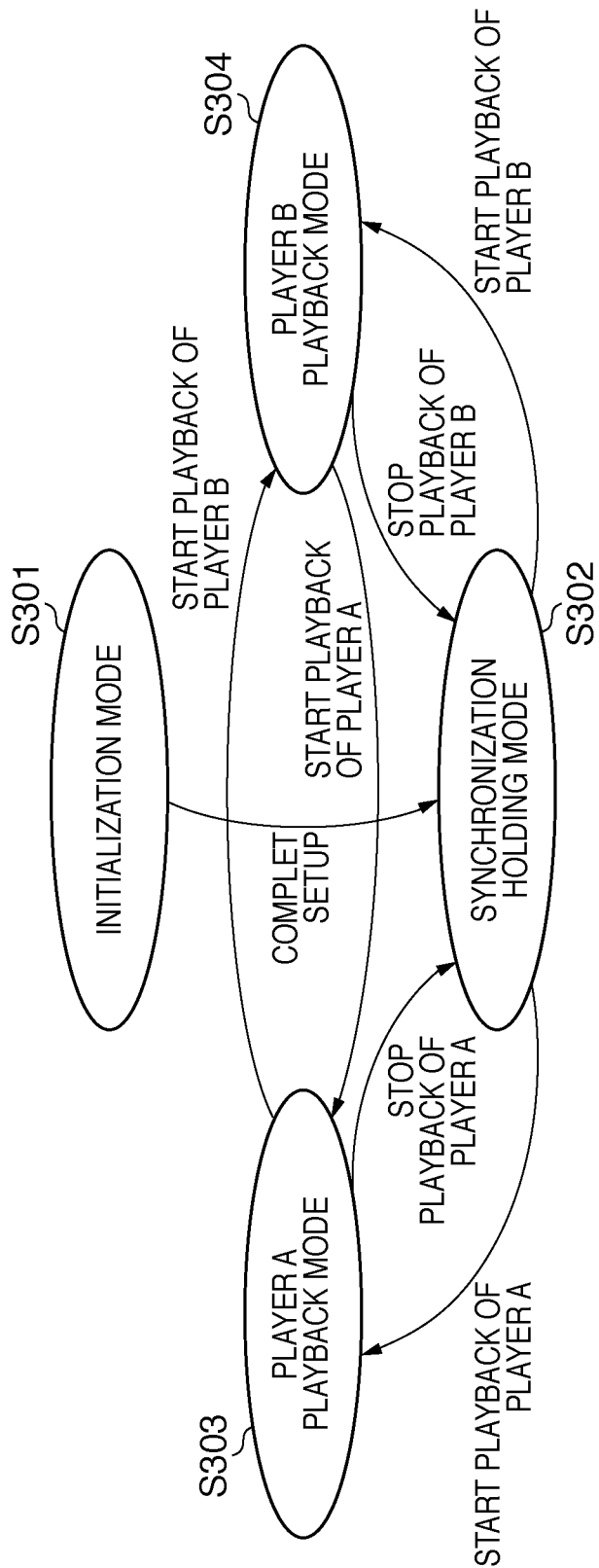
FIG. 13 is a view showing an example of the state transition of a 5.1 channel audio system according to the third embodiment.

FIG. 13 is a view showing an example of the state transition of the 5.1 channel audio system according to this embodiment. When powered on by a user, the system transitions to an initialization mode S301. The initialization mode 5301 is an operation mode in which a controller 210 transmits a command associated with system setup, such as a volume control command or a delay time adjustment command, to adapters 220 to 225. After the setup is completed, the system transits to a synchronization holding mode 5302.

The synchronization holding mode 5302 is an operation mode to transmit a signal aiming at synchronizing a transmission/reception clock when data such as audio data or setup data to be transmitted is not present. In the synchronization holding mode 5302, the controller 210 transmits non-effective data such as null data to the adapters 220 to 225, thereby continuing signal transmission.

A player A playback mode 5303 and a player B playback mode 5304 are operation modes to acoustically output playback data of the players 200 and 201 based on a user instruction. When playback of the player 200 or 201 stops in the player A playback mode 5303 or the player B playback mode 5304, the system transits to the synchronization holding mode 5302. When playback switches from the player 200 to the player 201, the system transits from the player A playback mode 5303 to the player B playback mode 5304. Conversely, when playback switches from the player 201 to the player 200, the system transits from the player B playback mode 5304 to the player A playback mode 5303.

FIG. 14 is a view showing an example of the structure of a frame transmitted in this embodiment. The transmission frame is formed from an OFDM symbol including a guard interval 402 and an effective symbol 403, a burst signal 401, and a frame adjustment signal 404 having a variable time length. OFDM indicates orthogonal frequency division multiplexing.

The burst signal 401 is a fixed length sinusoidal signal transmitted to synchronize the transmission/reception clock. The frame adjustment signal 404 changes its time length in accordance with temporal fluctuations in the input period of audio data received from the player 200 or 201. The variable range of the time length of the frame adjustment signal 404 is set to be equal to or larger than the temporal fluctuations in the audio data input period. A frame having a time length that matches the audio data input period including fluctuations is generated and transmitted.

That is, since a frame corresponding to deviation in the operation clock frequency of the player 200 or 201 is transmitted, neither overflow nor underflow occurs in the buffer memory. It is therefore possible to perform transmission without any operation error such as sound interruption.

The arrangement and operation of the controller 210 will be described next with reference to FIG. 12.

Figure 12:
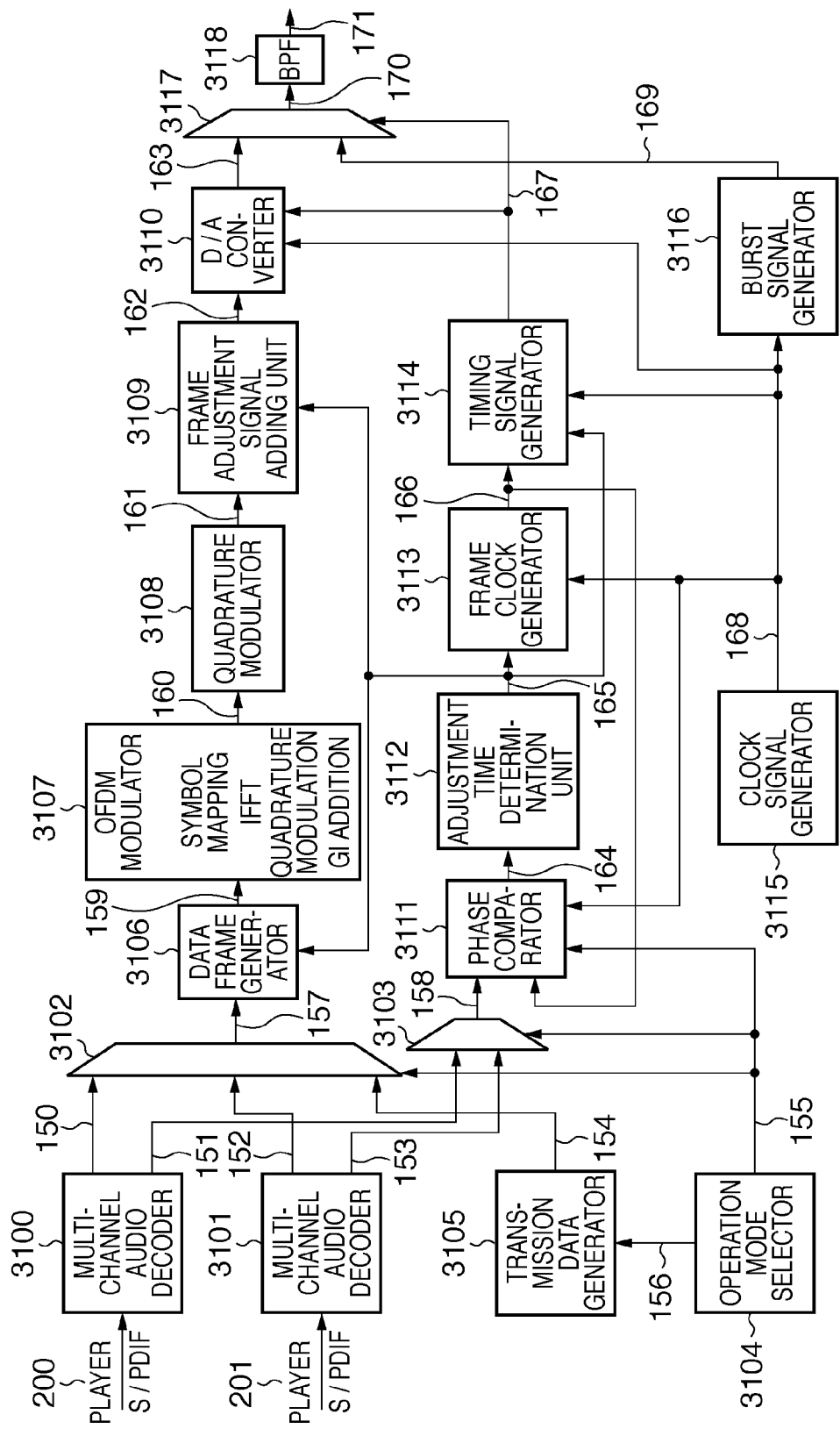
FIG. 12 is a block diagram showing an example of the arrangement of a controller according to the third embodiment.

FIG. 12 is a block diagram showing an example of the arrangement of the controller 210 according to this embodiment. Referring to FIG. 12, multi-channel audio decoders (to be referred to as decoders hereinafter) 3100 and 3101 have the same arrangement and perform the same operation. The decoder 3100 or 3101 decodes multi-channel audio data which is output from the player 200 or 201 and contains, for example, S/PDIF playback synchronizing data, thereby generating audio data in a PCM format for each channel and a playback synchronizing signal. The generated audio data is output to a data selector 3102 via a signal line 150 or 152. The playback synchronizing signal is output to a clock selector 3103 via a signal line 151 or 153. The playback synchronizing signal is generated from playback synchronizing data (the preamble of S/PDIF data) output from the player 200 or 201, and has the same period as the sampling period of the audio data.

Since the operation clock of the player 200 or 201 has temporal fluctuations, the playback synchronizing data in the audio data output from the player 200 or 201 and the playback synchronizing signal generated from the playback synchronizing data also have temporal fluctuations.

The data selector 3102 selectively outputs one of three inputs based on operation mode information received from an operation mode selector 3104 via a signal line 155. If the operation mode is the player A playback mode or the player B playback mode (first operation mode), the data selector 3102 outputs the audio data from the decoder 3100 or 3101 to a data frame generator 3106 via a signal line 157. If the operation mode is the initialization mode or the synchronization holding mode (second operation mode), the data selector 3102 outputs, to the data frame generator 3106, a signal received from a transmission data generator 3105 via a signal line 154.

The clock selector 3103 selectively outputs input signals based on operation mode information from the operation mode selector 3104. If the operation mode is the player A playback mode or the player B playback mode, the clock selector 3103 outputs the playback synchronizing signal output from the decoder 3100 or 3101 to a phase comparator 3111 via a signal line 158. If the operation mode is the initialization mode or the synchronization holding mode, the clock selector 3103 outputs no signal.

The operation mode selector 3104 selects operation mode information from the above-described four operation modes, and outputs it to the data selector 3102, the clock selector 3103, and the phase comparator 3111 via the signal line 155, and to the transmission data generator 3105 via a signal line 156.

If the operation mode is the initialization mode, the transmission data generator 3105 generates command data associated with system setup, such as a volume control command or a delay time adjustment command, and outputs the command data to the data selector 3102 via the signal line 154. If the operation mode is the synchronization holding mode, the transmission data generator 3105 generates null data, and outputs the null data to the data selector 3102.

The data frame generator 3106 generates a data frame shown in FIG. 15 based on the data received from the data selector 3102 and an adjustment time determination unit 3112.

FIG. 15 is a view showing an example of the structure of the data frame according to the embodiment. Referring to FIG. 15, reference numerals 1501, 1502, 1503, 1504, 1505, and 1506 denote data regions of C, FR, FL, RR, RL, and SW channels, respectively. Audio data or setup data of the respective channels are arranged in these data regions. Adjustment time information input from the adjustment time determination unit 3112 or operation mode information is set in an AUX region 1507. The adjustment time information is information necessary for generating a correct FFT window in demodulation, and will be described later in more detail.

Referring back to FIG. 12, the data frame generated by the data frame generator 3106 is output to an OFDM modulator 3107 via a signal line 159. The OFDM modulator 3107 OFDM-modulates the data frame received from the data frame generator 3106 to generate a complex OFDM baseband signal including an effective symbol and a guard interval, and outputs it to a quadrature modulator 3108 via a signal line 160.

The quadrature modulator 3108 quadrature-modulates the complex OFDM baseband signal received from the OFDM modulator 3107 to generate an OFDM passband signal, and outputs it to a frame adjustment signal adding unit 3109 via a signal line 161.

The frame adjustment signal adding unit 3109 generates an frame adjustment signal having a length corresponding to the adjustment time information received from the adjustment time determination unit 3112, and adds it to the OFDM passband signal. For example, a null signal is used as the frame adjustment signal. The OFDM passband signal added with the frame adjustment signal is output to a D/A converter 3110 via a signal line 162.

The D/A converter 3110 D/A-converts the output from the frame adjustment signal adding unit 3109 based on a clock received from a clock signal generator 3115 at the leading edge of an enable signal received from a timing signal generator 3114. The analog signal output from the D/A converter 3110 is output to an output signal selector 3117 via a signal line 163.

The phase comparator 3111 performs phase comparison based on operation mode information from the operation mode selector 3104. If the operation mode is the player A playback mode or the player B playback mode, the phase comparator 3111 counts the leading edge time difference between the output from the clock selector 3103 and the output from a frame clock generator 3113 based on the clock received from the clock signal generator 3115. The count value is output to the adjustment time determination unit 3112 via a signal line 164 as a phase difference count value (phase difference information). If the operation mode is the player A playback mode or the player B playback mode, the clock selector 3103 outputs the playback synchronizing signal. Hence, the phase comparator 3111 compares the phase of the leading edge of the playback synchronizing signal with that of the clock signal output from the frame clock generator 3113, and outputs the phase difference count value to the adjustment time determination unit 3112. If the operation mode is the initialization mode or the synchronization holding mode, the phase comparator 3111 outputs a phase difference count value "0" to the adjustment time determination unit 3112.

The adjustment time determination unit 3112 generates adjustment time information based on the phase difference count value output from the phase comparator 3111. The adjustment time information is output to the data frame generator 3106, the frame adjustment signal adding unit 3109, the frame clock generator 3113, and the timing signal generator 3114 via a signal line 165. The adjustment time information output from the adjustment time determination unit 3112 has upper and lower limit values. If the phase difference count value received from the phase comparator 3111 falls within the range defined by the upper and lower limit values, the adjustment time determination unit 3112 outputs the phase difference count value as adjustment time information. If the phase difference count value falls outside the range defined by the upper and lower limit values, the adjustment time determination unit 3112 outputs the upper or lower limit value closer to the phase difference count value as adjustment time information. As a result of this operation, the variable range of the time length of the frame adjustment signal falls within the set finite length range because the frame adjustment signal adding unit 3109 generates a frame adjustment signal having a time length based on the adjustment time information.

The frame clock generator 3113 generates a clock signal by dividing the frequency of the clock signal output from the clock signal generator 3115 and changing the leading edge timing based on the adjustment time information received from the adjustment time determination unit 3112. As a result of this operation, if the operation mode is the player A playback mode or the player B playback mode, the period of the clock signal generated by the frame clock generator 3113 almost matches that of the playback synchronizing signal including temporal fluctuations. The clock signal generated by the frame clock generator 3113 is output to the phase comparator 3111 and the timing signal generator 3114 via a signal line 166.

The timing signal generator 3114 generates an enable signal which holds H level during a time equal to the sum of the OFDM symbol time and the frame adjustment signal time after the elapse of a predetermined time Δd from the leading edge of the clock signal output from the frame clock generator 3113. The enable signal is output to the D/A converter 3110 and the output signal selector 3117 via a signal line 167. The time Δd has at least a length equal to or longer than the maximum period of the clock signal generated by the frame clock generator 3113.

The clock signal generator 3115 outputs the clock signal to the phase comparator 3111, the frame clock generator 3113, the D/A converter 3110, the timing signal generator 3114, and a burst signal generator 3116 via a signal line 168. The clock signal is generated from a clock source independently of those of the players 200 and 201 and has sufficiently small jitter suitable for an OFDM modulation/demodulation system.

The burst signal generator 3116 divides the frequency of the signal from the clock signal generator 3115 to generate a transmission/reception clock synchronizing signal, and outputs it to the output signal selector 3117 via a signal line 169.

The output signal selector 3117 operates based on the enable signal received from the timing signal generator 3114. When the enable signal is at H level, the output signal selector 3117 selects the output from the D/A converter 3110, and outputs it to a BPF 3118 via a signal line 170. When the enable signal is at L level, the output signal selector 3117 selects the output from the burst signal generator 3116, and outputs it to the BPF 3118.

The BPF 3118 is a bandpass filter to limit the band. The signal which has passed through the BPF 3118 is output to the transmission path via a signal line 171. The BPF 3118 removes higher harmonics from the burst signal to generate a sinusoidal signal, and outputs it to the transmission path.

As a result of the operations of these units, the transmission frame shown in FIG. 14 is output to the transmission path. Since the time length of the frame adjustment signal changes in accordance with the input period of the audio data including temporal fluctuations, a frame having a time length that matches the input period of the audio data is transmitted.

A detailed operation of the controller 210 will be described using a detailed example. System conditions are as follows, though the present invention is not limited to them.

Sampling frequency of audio data: 48 kHz
Clock frequency output from the clock signal generator 3115: 90 MHz
Burst signal time: 3.28 μsec (295 clocks at 90 MHz)
Burst signal frequency: 18 MHz
OFDM symbol time: 17.5 μsec (1,575 clocks at 90 MHz)
Variable time range of the frame adjustment signal: 0 to 111 nsec (0 to 10 clocks at 90 MHz)
The time length of the frame adjustment signal is 55.5 nsec (5 clocks at 90 MHz) when the adjustment time information output from the adjustment time determination unit 3112 is 0. That is, the time length changes depending on the adjustment time information.

Figure 17A:
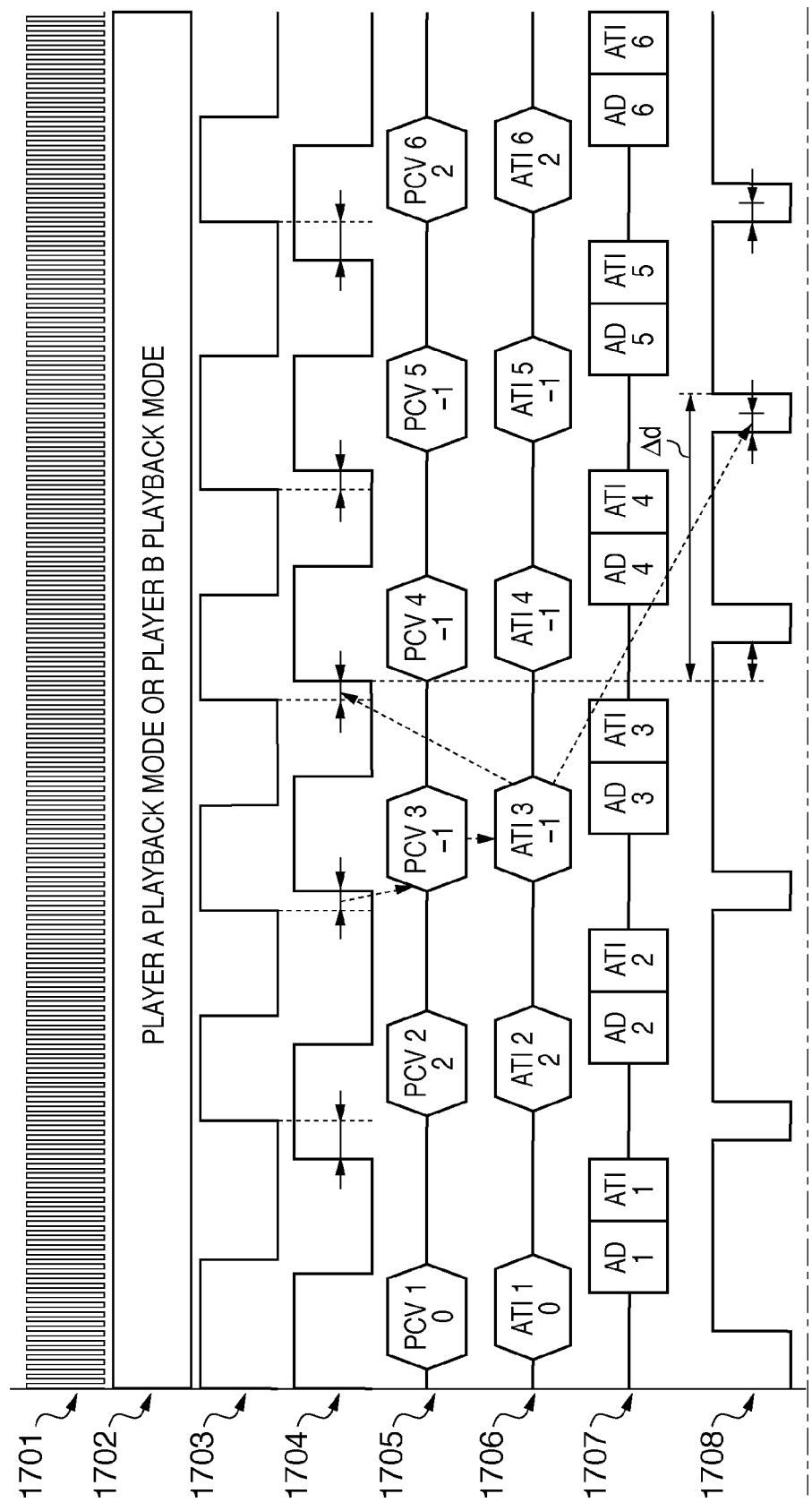
FIGS. 17A and 17B are timing charts showing timings in a player A playback mode and a player B playback mode.
Figure 17B:
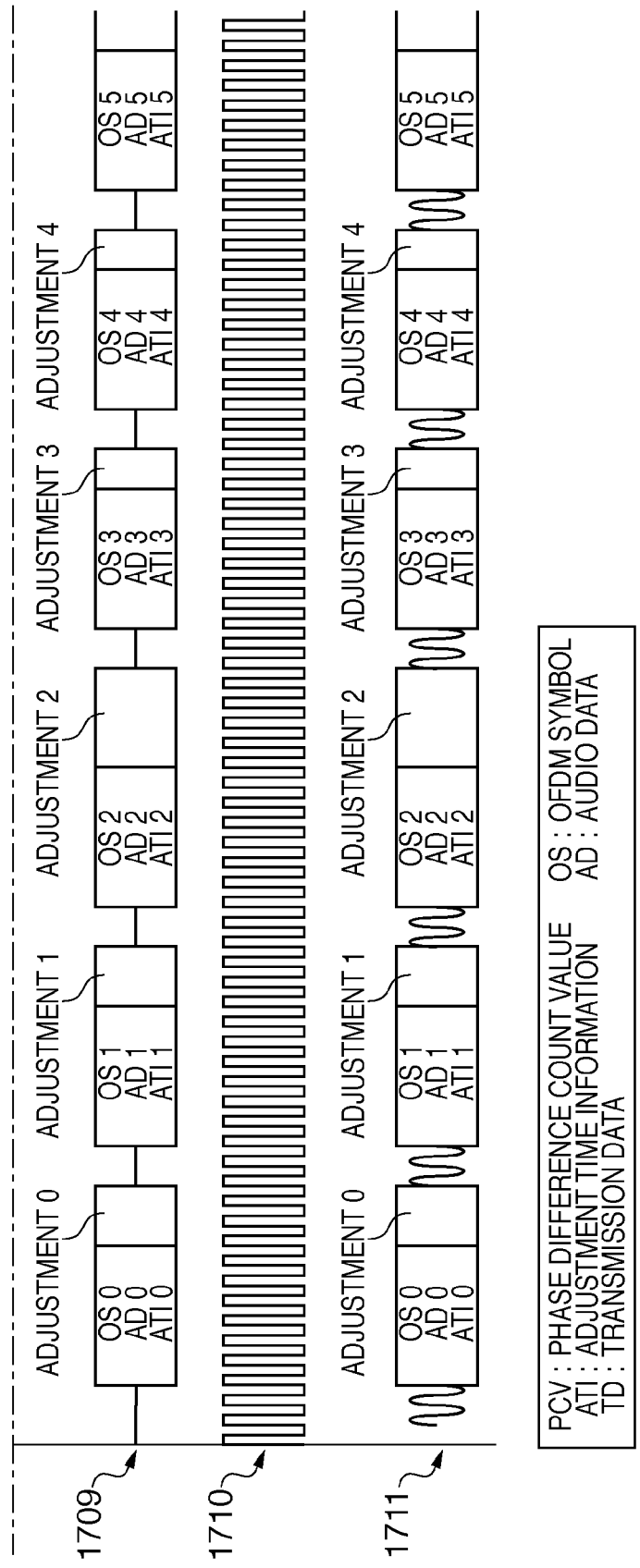

The timings of the internal signals of the controller 210 in the respective operation modes will be described with reference to FIGS. 16A to 19B. FIGS. 16A and 16B are timing charts showing timings in the initialization mode and the synchronization holding mode. FIGS. 17A and 17B are timing charts showing timings in the player A playback mode and the player B playback mode. FIGS. 18A and 18B are timing charts showing transition from the synchronization holding mode to the player A playback mode. FIGS. 19A and 19B are timing charts showing transition from the player A playback mode to the player B playback mode.

In the initialization mode and the synchronization holding mode, the operation based on the output from the player 200 or 201 is not performed. A data frame at a period of 48 kHz, which is generated based on the 90-MHz clock output from the clock signal generator 3115, is transmitted.

Referring to FIGS. 16A and 16B, the clock signal generator 3115 generates a clock signal 601 having a frequency of 90 MHz. A signal 602 output from the operation mode selector 3104 is set in the initialization mode or the synchronization holding mode. In the initialization mode or the synchronization holding mode, the clock selector 3103 outputs no clock signal 603. The frame clock generator 3113 outputs a clock signal 604.

Since the adjustment time information output from the adjustment time determination unit 3112 is 0, the frame clock generator 3113 divides the frequency of the 90-MHz clock signal received from the clock signal generator 3115 to generate a 48-kHz clock signal, and outputs it.

The phase comparator 3111 outputs a phase difference count value 605. When the operation mode is the initialization mode or the synchronization holding mode, the phase comparator 3111 always outputs a phase difference count value "0". The adjustment time determination unit 3112 outputs adjustment time information 606. Since the phase difference count value is "0", the adjustment time information is "0", too.

The data frame generator 3106 outputs a data frame 607. In the initialization mode, the data frame generator 3106 generates a data frame including setup data and adjustment time information. In the synchronization holding mode, the data frame generator 3106 generates a data frame including null data and adjustment time information. The data frame generator 3106 generates a predetermined number of data frames having a fixed pattern from the start of the initialization mode. The data frame is OFDM-modulated by the OFDM modulator 3107 and transmitted to the adapter as a preamble signal for symbol timing detection.

The timing signal generator 3114 outputs an enable signal 608. The enable signal holds H level during a time equal to the sum of the times of the OFDM symbol and the frame adjustment signal after the elapse of the predetermined time Δd from the leading edge of the clock signal output from the frame clock generator 3113. In the initialization mode and the synchronization holding mode, since the phase comparator 3111 outputs the count value "0", the time length of the frame adjustment signal is always 55.5 nsec (corresponding to 5 points at 90 MHz). For this reason, the H level time of the enable signal is 17.555 μsec (corresponding to 1,580 points at 90 MHz).

The D/A converter 3110 outputs an OFDM passband signal 609 added with a frame adjustment signal. The burst signal generator 3116 outputs a burst signal 610 which is a 18-MHz clock signal generated by dividing the frequency of the 90-MHz clock signal received from the clock signal generator 3115.

The BPF 3118 outputs a frame signal 611 to the transmission path. The sum of the OFDM symbol time, burst signal time, and frame adjustment signal time is 17.5 μsec+3.28 μsec+55.5 nsec=20.83 μsec (48 kHz).

The operation of the controller 210 in the player A playback mode or the player B playback mode will be described next with reference to FIGS. 17A and 17B. In the player A playback mode or the player B playback mode, a signal having a frame length corresponding to the input period of audio data including temporal fluctuations is generated and transmitted.

Referring to FIGS. 17A and 17B, the clock signal generator 3115 generates a clock signal 1701 having a frequency of 90 MHz. A signal 1702 output from the operation mode selector 3104 is set in the player A playback mode or the player B playback mode. The clock selector 3103 outputs a playback synchronizing signal 1703 including temporal fluctuations. The frame clock generator 3113 outputs a clock signal 1704. The frame clock generator 3113 generates the clock signal by changing the leading edge point based on adjustment time information, thereby outputting a clock signal that almost matches the period of the playback synchronizing signal.

The phase comparator 3111 outputs a phase difference count value 1705. The phase comparator 3111 outputs a value obtained by counting the leading edge time difference between the playback synchronizing signal and the clock signal output from the frame clock generator 3113 based on the clock signal from the clock signal generator 3115.

The adjustment time determination unit 3112 outputs adjustment time information 1706. When the phase difference count value exceeds the upper limit value "5" or the lower limit value "−5", the adjustment time determination unit 3112 outputs "5" or "−5". When the phase difference count value falls within the range of ±5, the adjustment time determination unit 3112 outputs the phase count value as adjustment time information.

The data frame generator 3106 outputs a data frame 1707. The data frame generator 3106 generates a data frame including the audio data output from the data selector 3102 and the adjustment time information output from the adjustment time determination unit 3112. The timing signal generator 3114 outputs an enable signal 1708. In the player A playback mode or the player B playback mode, the enable signal holds H level during a time corresponding to the adjustment time information output from the adjustment time determination unit 3112.

The D/A converter 3110 outputs an OFDM passband signal 1709 added with a frame adjustment signal. The burst signal generator 3116 outputs a burst signal 1710 which is an 18-MHz clock signal generated by dividing the frequency of the 90-MHz clock signal received from the clock signal generator 3115 by five.

The BPF 3118 outputs a frame signal 1711 to the transmission path. The sum of the OFDM symbol time, burst signal time, and frame adjustment signal time is 17.5 μsec+3.28 μsec+0 to 111 nsec=20.78 to 20.88 μsec. More specifically, when the input period of the audio data fluctuates within the range of 20.78 to 20.88 μsec, frames are transmitted in synchronism with the audio data input timing, including the fluctuations. This makes it possible to transmit the audio data without overflow or underflow of the buffer memory caused by temporal fluctuations in the input period of the audio data.

The operation of the controller 210 upon switching the synchronization holding mode to the player A playback mode or the player B playback mode will be described next with reference to FIGS. 18A and 18B. At the time of switching, the phase of the playback synchronizing signal output from the clock selector 3103 is random. The controller 210 continues transmission while changing the time length of the frame adjustment signal to the maximum within the variable range, thereby quickly ensuring synchronization with the audio data input timing. This operation enables operation mode switching without sound interruption.

Referring to FIGS. 18A and 18B, the clock signal generator 3115 generates a clock signal 801 having a frequency of 90 MHz. A signal 802 output from the operation mode selector 3104 represents switching from the synchronization holding mode to the player A playback mode or the player B playback mode.

The clock selector 3103 outputs a playback synchronizing signal 803. When the operation mode is the synchronization holding mode, the clock selector 3103 outputs no signal. In the player A playback mode or the player B playback mode, the clock selector 3103 outputs a playback synchronizing signal including temporal fluctuations.

The frame clock generator 3113 outputs a clock signal 804. The frame clock generator 3113 generates the clock signal by changing the leading edge point based on adjustment time information. The phase comparator 3111 outputs a phase difference count value 805. The phase comparator 3111 outputs a value obtained by counting the leading edge time difference between the playback synchronizing signal and the clock signal output from the frame clock generator 3113 based on the clock from the clock signal generator 3115.

The adjustment time determination unit 3112 outputs adjustment time information 806. When the phase difference count value falls outside the range of ±5, the adjustment time determination unit 3112 outputs "5" or "−5". When the phase difference count value falls within the range of ±5, the adjustment time determination unit 3112 outputs the phase count value as adjustment time information. The data frame generator 3106 outputs a data frame 807. The timing signal generator 3114 outputs an enable signal 808. The D/A converter 3110 outputs an OFDM passband signal 809 added with a frame adjustment signal.

The burst signal generator 3116 outputs a burst signal 810 which is a 18-MHz clock signal generated by dividing the frequency of the 90-MHz clock signal received from the clock signal generator 3115 by five. The BPF 3118 outputs a frame signal 811 to the transmission path.

The operation of the controller 210 upon switching the player A playback mode to the player B playback mode will be described next with reference to FIGS. 19A and 19B.

At the time of switching, the phase of the playback synchronizing signal output from the clock selector 3103 is random. The operation is similar to that shown in FIGS. 18A and 18B upon switching the synchronization holding mode to the player A playback mode to the player B playback mode.

Referring to FIGS. 19A and 19B, the clock signal generator 3115 generates a clock signal 901 having a frequency of 90 MHz. A signal 902 output from the operation mode selector 3104 represents switching from the player A playback mode to the player B playback mode.

The clock selector 3103 outputs a playback synchronizing signal 903. At the time of switching from the player A playback mode to the player B playback mode, the clock selector 3103 outputs a playback synchronizing signal with a random phase. The frame clock generator 3113 outputs a clock signal 904.

The phase comparator 3111 outputs a phase difference count value 905. The adjustment time determination unit 3112 outputs adjustment time information 906. When the phase difference count value falls outside the range of ±5, the adjustment time determination unit 3112 outputs "5" or "−5". When the phase difference count value falls within the range of ±5, the adjustment time determination unit 3112 outputs the phase count value as adjustment time information.

The data frame generator 3106 outputs a data frame 907. The timing signal generator 3114 outputs an enable signal 908. The D/A converter 3110 outputs an OFDM passband signal 909 added with a frame adjustment signal.

The burst signal generator 3116 outputs a burst signal 910 which is a 18-MHz clock signal generated by dividing the frequency of the 90-MHz clock signal received from the clock signal generator 3115 by five. The BPF 3118 outputs a frame signal 911 to the transmission path.

As shown in FIGS. 18A to 19B, upon switching the operation mode, the controller 210 continues transmission while changing the time length of the frame adjustment signal to the maximum within the variable range, thereby quickly ensuring synchronization with the audio data input timing, and switching the operation mode without sound interruption.

The arrangement and operation of the adapters 220 to 225 will be described next with reference to FIGS. 20 and 21. Since the adapters 220 to 225 have the same arrangement, they will be simply referred as an adapter here.

Figure 20:
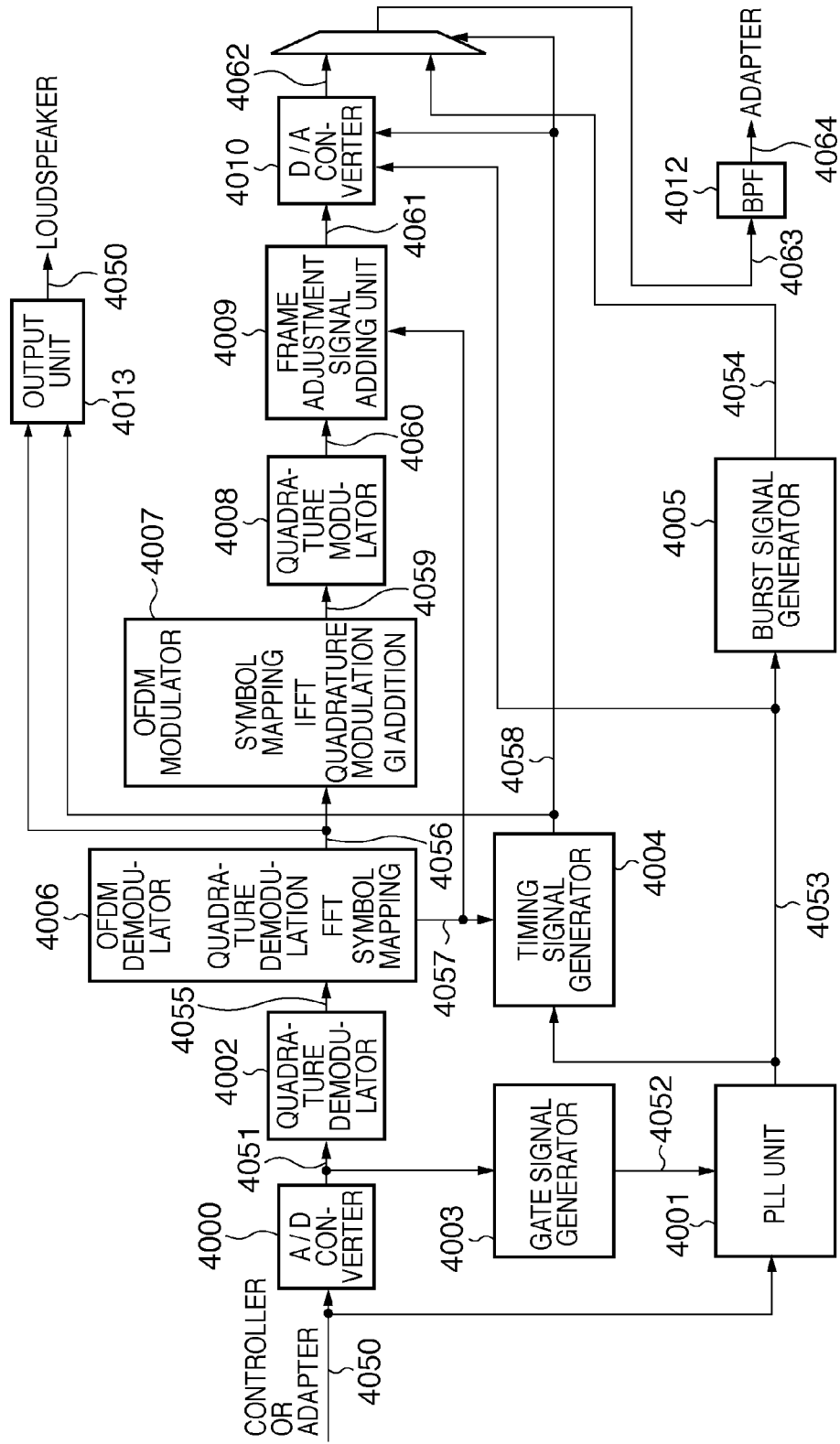
FIG. 20 is a block diagram showing an example of the arrangement of an adapter according to the third embodiment.

FIG. 20 is a block diagram showing an example of the arrangement of the adapter according to this embodiment. FIG. 21 is a timing chart showing the timings of input/output and internal signals of the adapter according to this embodiment.

Referring to FIG. 20, a reception signal is input to an A/D converter 4000 and a PLL unit 4001 via a signal line 4050. The A/D converter 4000 A/D-converts the reception signal, and outputs the digital reception signal to a quadrature demodulator 4002 and a gate signal generator 4003 via a signal line 4051.

The gate signal generator 4003 detects a burst signal based on the output from the A/D converter 4000, thereby generating a gate signal which holds H level during an arbitrary time in the burst signal interval. The gate signal is output to the PLL unit 4001 via a signal line 4052.

The PLL unit 4001 extracts a burst signal from the transmission signal output from the controller 210 or the adapter connected upstream using, as a window signal, the gate signal received from the gate signal generator 4003. The PLL unit 4001 multiplies the burst signal by a PLL (Phase-Locked Loop) to generate a clock signal, and outputs it to a timing signal generator 4004, a burst signal generator 4005, and a D/A converter 4010 via a signal line 4053.

The burst signal generator 4005 divides the frequency of the clock signal received from the PLL unit 4001 to generate a transmission/reception clock synchronizing signal, and outputs it to an output signal selector 4011 via a signal line 4054.

The quadrature demodulator 4002 quadrature-modulates the digital signal received from the A/D converter 4000 to generate a complex OFDM baseband signal, and outputs it to an OFDM demodulator 4006 via a signal line 4055.

The OFDM demodulator 4006 OFDM-demodulates the complex OFDM baseband signal, thereby generating a data frame. The OFDM demodulator 4006 also detects a symbol timing using a preamble signal received in the initialization mode. The preamble signal has a known waveform. It is therefore possible to detect a symbol timing by storing preamble waveform data in advance and calculating cross-correlation to the reception signal. From then on, the OFDM demodulator 4006 adjusts the symbol timing of a succeeding frame using adjustment time information included in the data frame. More specifically, demodulation processing is performed at a correct timing by controlling the timing of generating the FFT window of a succeeding frame based on the adjustment time information. The generated data frame is output to an output unit 4013 and an OFDM modulator 4007 via a signal line 4056. The adjustment time information in the data frame is output to the timing signal generator 4004 and a frame adjustment signal adding unit 4009 via a signal line 4057.

The timing signal generator 4004 operates based on the clock signal received from the PLL unit 4001 ad the adjustment time information output from the OFDM demodulator 4006. The timing signal generator 4004 generates an enable signal which holds H level during a time equal to the sum of the OFDM symbol time and the frame adjustment signal time. The enable signal is output to the D/A converter 4010, the output signal selector 4011, and the output unit 4013 via a signal line 4058. In the adapters 220 to 225, the enable signal is also used as a playback synchronizing signal.

The OFDM modulator 4007 OFDM-modulates the data frame received from the OFDM demodulator 4006 to generates a complex OFDM baseband signal. The generated complex OFDM baseband signal is output to a quadrature modulator 4008 via a signal line 4059.

The quadrature modulator 4008 quadrature-modulates the complex OFDM baseband signal received from the OFDM modulator 4007 to generate an OFDM passband signal, and outputs it to the frame adjustment signal adding unit 4009 via a signal line 4060.

The frame adjustment signal adding unit 4009 generates a frame adjustment signal having a length corresponding to the adjustment time information received from the OFDM demodulator 4006, and adds it to the OFDM passband signal. The OFDM passband signal added with the frame adjustment signal is output to the D/A converter 4010 via a signal line 4061.

The D/A converter 4010 D/A-converts the output from the frame adjustment signal adding unit 4009 based on the clock signal received from the PLL unit 4001 at the leading edge of the enable signal received from the timing signal generator 4004. The D/A converter 4010 outputs the analog signal to the output signal selector 4011 via a signal line 4062.

The output signal selector 4011 operates based on the enable signal received from the timing signal generator 4004. When the enable signal is at H level, the output signal selector 4011 selects the output from the D/A converter 4010, and outputs it to a BPF 4012 via a signal line 4063. When the enable signal is at L level, the output signal selector 4011 selects the output from the burst signal generator 4005, and outputs it to the BPF 4012.

The BPF 4012 is a bandpass filter to limit the band. The signal which has passed through the BPF 4012 is output to the transmission path via a signal line 4064.

The output unit 4013 extracts the audio data and setup data of the self channel from the data frame received from the OFDM demodulator 4006. In the initialization mode, delay time adjustment or volume control of the speaker output is done based on the extracted setup data. In the player A playback mode and the player B playback mode, the extracted audio data is output to the speaker based on the enable signal received from the timing signal generator 4004 so that a correct sound is obtained.

As a result of the operations of these units, the adapter transmits, to the adapter connected downstream, a signal having the same frame period and the same structure as the reception signal, including fluctuations, received from the controller 210 or the adapter connected upstream, independently of the operation mode.

The adapters 220 to 225 perform a uniform operation in all operation modes. FIG. 21 is a timing chart showing the timings of input/output and internal signals of the adapters 220 to 225 in the player A playback mode.

Referring to FIG. 21, a reception signal 1101 from the controller 210 or the adapter connected upstream is output from the A/D converter 4000. The time length of each frame includes fluctuations. The gate signal generator 4003 outputs a gate signal 1102. The gate signal generator 4003 detects a burst signal from the reception signal output from the A/D converter 4000, and outputs a gate signal which holds H level during an arbitrary time in the burst signal interval.

The PLL unit 4001 outputs a clock signal 1103. The PLL unit 4001 multiplies the clock signal generator by five, and outputs a 90-MHz clock signal. The OFDM demodulator 4006 outputs a data frame 1104. The OFDM demodulator 4006 controls the symbol timing of a succeeding frame based on the adjustment time information in the data frame, thereby executing demodulation processing at a correct timing.

The timing signal generator 4004 outputs an enable signal 1105. The enable signal is used by the output signal selector 4011 to switch the output between the OFDM passband signal and the burst signal and by the output unit 4013 as an output timing signal to the speaker.

The burst signal generator 4005 outputs a burst signal 1106. The BPF 4012 outputs a transmission frame 1107 to the transmission path.

As shown in FIG. 21, the adapter transmits, to the adapter connected downstream, a signal having the same frame period and the same structure as the reception signal, including fluctuations, received from the controller 210 or the adapter connected upstream.

According to this embodiment, when data input at a predetermined period is transmitted as continuous frames having a predetermined structure, it is possible to perform switching without any operation error such as sound interruption even if the operation changes due to, for example, external device switching.

Even when a buffer memory with a small capacity is used, it is possible to guarantee a stable operation without overflow or underflow of the buffer memory.

In the embodiment, audio data transmission has been described as an example. However, the present invention is not limited to this. This embodiment is particularly useful for streaming transmission of large data such as high-definition TV data.

This embodiment is useful when synchronization of the operation clock or the frequency in modulation/demodulation processing is necessary between the transmission and reception apparatuses because the frame includes a burst signal.

This embodiment is useful when the length of the portion including significant data in data transmission is fixed because a portion including no significant data in data transmission is provided separately from the portion including significant data, and the length of the portion is increased or decreased.

For these reasons, this embodiment is suitable when synchronization of the frequency in modulation/demodulation processing is necessary between the transmission and reception apparatuses, and the length of the portion including significant data in data transmission (an effective symbol in the OFDM modulation/demodulation method) is fixed, as in the OFDM modulation/demodulation method.

(Other Embodiments)

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-121645, filed May 7, 2008, and No. 2008-121647, filed May 7, 2008, which are hereby incorporated by reference herein in their entirety.

What is claimed is:

1. A transmission apparatus capable of operating while switching between a first operation mode to transmit a transmission frame generated from data input from an external device and a second operation mode to transmit a transmission frame generated from data generated in the transmission apparatus, comprising:

a decoder configured to decode multi-channel audio data which is input from the external device and which includes playback synchronization data, to generate data frame and a playback synchronizing signal;

a transmission data generator configured to generate one of null data and command data associated with system setup;

a data selector configured to output the audio data generated by said decoder in the first operation mode, and to output the data generated by said transmission data generator in the second operation mode;
a clock selector configured to control to output the playback synchronizing signal generated by said decoder in the first operation mode and not to output a signal in the second operation mode;
a clock signal generator configured to generate a clock signal having a period corresponding to a period of the playback synchronizing signal;
an output unit configured to output phase difference information between the playback synchronizing signal generated by said decoder and the clock signal generated by said clock signal generator in the first operation mode, and to output predetermined phase difference information in the second operation mode;
an adjustment time determination unit configured to generate adjustment time information based on an output from said output unit;
a data frame generator configured to generate a data frame based on an output from said data selector and the adjustment time information generated by said adjustment time determination unit;
an OFDM symbol generator configured to generate an OFDM symbol from the data frame generated by said data frame generator;
a burst signal generator configured to generate a burst signal;
a transmission frame generator configured to generate a transmission frame including the burst signal, the OFDM symbol, and a frame adjustment signal having a length corresponding to the adjustment time information; and
a transmitter configured to transmit the transmission frame in synchronism with the period of the clock signal generated by said clock signal generator.

2. A control method of a transmission apparatus, which is capable of operating while switching between a first operation mode to transmit a transmission frame generated from data input from an external device and a second operation mode to transmit a transmission frame generated from data generated in the transmission apparatus, the method comprising:
decoding, by a decoder, multi-channel audio data which is input from the external device and which includes playback synchronization data, to generate data frame and a playback synchronizing signal;
generating, by a transmission data generator, one of null data and command data associated with system setup;
outputting, by a data selector, the audio data generated by said decoder in the first operation mode, and to output the data generated by said transmission data generator in the second operation mode;
controlling, by a clock selector, to output the playback synchronizing signal generated by said decoder in the first operation mode and not to output a signal in the second operation mode;
generating, by a clock signal generator, a clock signal having a period corresponding to a period of the playback synchronizing signal;
output, by an output unit, phase difference information between the playback synchronizing signal generated by said decoder and the clock signal generated by said clock signal generator in the first operation mode, and outputting predetermined phase difference information in the second operation mode;
generating, by an adjustment time determination unit, adjustment time information based on an output from said output unit;
generating, by a data frame generator, a data frame based on an output from said data selector and the adjustment time information generated by said adjustment time determination unit;
generating, by an OFDM symbol generator, an OFDM symbol from the data frame generated by said data frame generator;
generating, by a burst signal generator, a burst signal;
generating, by a transmission frame generator, a transmission frame including the burst signal, the OFDM symbol, and a frame adjustment signal having a length corresponding to the adjustment time information; and
transmitting, by a transmitter, the transmission frame in synchronism with the period of the clock signal generated by said clock signal generator.

3. A transmission apparatus capable of operating while switching between a first operation mode to transmit a transmission frame generated from data input from an external device and a second operation mode to transmit a transmission frame generated from data generated in the transmission apparatus, comprising:
a decoder configured to decode multi-channel audio data which is input from the external device and which includes playback synchronization data, to generate data frame and a playback synchronizing signal;
a transmission data generator configured to generate one of null data and command data associated with system setup;
a data selector configured to output the audio data generated by said decoder in the first operation mode, and to output the data generated by said transmission data generator in the second operation mode;
a clock selector configured to control to output the playback synchronizing signal generated by said decoder in the first operation mode and not to output a signal in the second operation mode;
an OFDM symbol generator configured to generate an OFDM symbol from a generated data frame;
a burst signal generator configured to generate a burst signal;
a transmission frame generator configured to generate a transmission frame including the burst signal, the OFDM symbol, and a frame adjustment signal having a length corresponding to an adjustment time information; and
a transmitter configured to transmit the transmission frame.

4. The apparatus according to claim 3, wherein said data frame is generated based on an output from said data selector and the adjustment time information.

5. A control method of a transmission apparatus, which is capable of operating while switching between a first operation mode to transmit a transmission frame generated from data input from an external device and a second operation mode to transmit a transmission frame generated from data generated in the transmission apparatus, the method comprising:
decoding, by a decoder, multi-channel audio data which is input from the external device and which includes playback synchronization data, to generate data frame and a playback synchronizing signal;
generating, by a transmission data generator, one of null data and command data associated with system setup;

outputting, by a data selector, the audio data generated by said decoder in the first operation mode, and outputting the data generated by said transmission data generator in the second operation mode;

controlling, by a clock selector, to output the playback synchronizing signal generated by said decoder in the first operation mode and not to output a signal in the second operation mode;

generating, by an OFDM symbol generator, an OFDM symbol from a generated data frame;

generating, by a burst signal generator, a burst signal;

generating, by a transmission frame generator, a transmission frame including the burst signal, the OFDM symbol, and a frame adjustment signal having a length corresponding to a adjustment time information; and transmitting, by a transmitter, the transmission frame.

6. A non-transitory computer-readable storage medium which stores a program for causing a computer included in a transmission apparatus that is capable of operating, while switching between a first operation mode to transmit a transmission frame generated from data input from an external device and a second operation mode to transmit a transmission frame generated from data generated in the transmission apparatus, to:

decode multi-channel audio data which is input from the external device and which includes playback synchronization data, to generate data frame and a playback synchronizing signal;

generate one of null data and command data associated with system setup;

output the decoded audio data in the first operation mode, and output the one of null data and command data in the second operation mode;

control to output the playback synchronizing signal in the first operation mode and not to output a signal in the second operation mode;

generate an OFDM symbol from a generated data frame;

generate a burst signal;

generate a transmission frame including the burst signal, the OFDM symbol, and a frame adjustment signal having a length corresponding to adjustment time information; and transmit the transmission frame.

* * * * *